(12) United States Patent
Lutz et al.

(10) Patent No.: US 11,359,054 B2
(45) Date of Patent: Jun. 14, 2022

(54) UNIFORM SEQUENCE-DEFINED POLYURETHANES AND USES THEREOF AS MOLECULAR LABELS

(71) Applicants: CENTRE NATIONAL DE LA RECHERCHE SCIENTIFIQUE, Paris (FR); UNIVERSITÉ D'AIX-MARSEILLE, Marseilles (FR)

(72) Inventors: Jean-François Lutz, Kehl (DE); Ufuk Saim Gunay, Istanbul (TR); Didier Gigmes, Allauch (FR); Laurence Charles-Coulibeuf, Marseilles (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 683 days.

(21) Appl. No.: 16/301,390

(22) PCT Filed: May 11, 2017

(86) PCT No.: PCT/EP2017/061375
§ 371 (c)(1),
(2) Date: Nov. 13, 2018

(87) PCT Pub. No.: WO2017/194694
PCT Pub. Date: Nov. 16, 2017

(65) Prior Publication Data
US 2020/0407503 A1 Dec. 31, 2020

(30) Foreign Application Priority Data
May 13, 2016 (EP) .................................... 16169683

(51) Int. Cl.
*C08G 71/04* (2006.01)
*C08J 5/18* (2006.01)
*C08L 25/06* (2006.01)

(52) U.S. Cl.
CPC ................ *C08G 71/04* (2013.01); *C08J 5/18* (2013.01); *C08L 25/06* (2013.01); *C08J 2325/06* (2013.01); *C08J 2475/04* (2013.01)

(58) Field of Classification Search
CPC ....... C08L 75/04; C08G 71/04; C08J 2475/04
See application file for complete search history.

(56) References Cited

U.S. PATENT DOCUMENTS 5,475,066 A 12/1995 Nikles et al.
6,090,912 A 7/2000 Lebl et al.

FOREIGN PATENT DOCUMENTS

CN 103275334 A 9/2013
CN 103275334 B 3/2015

OTHER PUBLICATIONS

Ghosh An Efficient Synthesis of Functionalized Urethanes from Azides, J Chem Soc Chem Commun. 1992 ; 1992(18): 1308-1310, published on Dec. 1992.*
Kilburn et al A novel facile solid-phase strategy for the synthesis of N,N',N"-substituted guanidines, Tetrahedron, vol. 59, issue 9, , pp. 1739-1743, published on Feb. 25, 2002.*
Gunau et al Chemoselective Synthesis of Uniform Sequence-Coded Polyurethanes and Their Use as Molecular Tags, Chem 1, 114-126, published on Jul. 7, 2016.*
Iwakura, Y., et al., "Linear Oligometers of Polypentamethyleneurethan," Die Makromolekulare Chemie 1965;89:214-227.
Iwakura, Y., et al., "Linear Oligoethylene Urethanes Oligourethanes 111," Die Makromolekulare Chemie 1966;95:217-227.
Iwakura, Y., et al., "Linear Oligomethyleneurethans," Die Makromolekulare Chemie 1966;98:13-20.
Neffgen, S., et al., "Polymerization of 2,2-dimethyltrimethylene urethane; a disfavoured process," Macromol. Chem. Phys. 1998;199(2):197-206.
Jun. 12, 2017 International Search Report (ISR) and Written Opinion (WO) of the International Search Authority (ISA) issued on International Application No. PCT/EP2017/061375.

* cited by examiner

*Primary Examiner* — Gregory Listvoyb
(74) *Attorney, Agent, or Firm* — Kenealy Vaidya LLP

(57) ABSTRACT

Some embodiments are directed to sequence-defined polyurethanes and methods of making and using same.

21 Claims, 4 Drawing Sheets

UNIFORM SEQUENCE-DEFINED POLYURETHANES AND USES THEREOF AS MOLECULAR LABELS

CROSS REFERENCE TO RELATED APPLICATIONS

This application is a national phase filing under 35 C.F.R. § 371 of and claims priority to PCT Patent Application No. PCT/EP2017/061375, filed on May 11, 2017, which claims the priority benefit under 35 U.S.C. § 119 of European Patent Application No. 16169683.6, filed on 13 May 2016, the contents of each of which are hereby incorporated in their entireties by reference.

BACKGROUND

Some embodiments relate to sequence-defined polyurethanes and methods of making and using same.

Sequence-defined polymers are epitomized in nature by polypeptides and nucleic acids. In nature, these sequence-defined polymers can create biomaterials, encode information, perform biocatalysis, participate in molecular recognition, and shuttle species across membranes. Artificial sequence-defined polymers prepared by chemical synthesis likewise have the potential to create tremendous structural diversity and functionality based on monomer sequence, if such synthetic polymers can be developed.

SUMMARY

To date the vast majority of synthetic sequence-defined polymers are polypeptides, pseudopeptides, and/or peptoids made in laboratories using in vitro application of macromolecular machines, solution chemical synthesis, or solid phase synthesis. Related art sequence-defined polymers typically include amino acid structures with non-natural side chains and peptide bonds to achieve the reactivity associated with naturally-occurring polypeptides.

It may be beneficial to develop methods for preparing sequence-defined commodity plastics such as polyesters, polyamides, and polyurethanes (PUs), which are currently usually prepared by step-growth polymerization, which is a straightforward but poorly-controlled process. For instance, PUs are generally obtained by reacting a diisocyanate with a diol, thus leading to polymers containing two asymmetric carbamates per repeat unit (FIG. 1A). Although such PUs are widely applied as sealants, coatings and adhesives, they exhibit ill-defined molecular structures, which is evidenced by a dispersity value Đ of about 2. In addition, polymers formed through a step-growth mechanism exhibit, in general, simple repeating monomer sequences. In contrast, it has been shown in recent years that uniform sequence-controlled synthetic polymers (Đ~1), that are as molecularly-defined as natural polymers such as nucleic acids and proteins, can be prepared using molecular machines [1], nucleic acid templates [2] or using multistep-growth approaches, in which monomers are assembled one-by-one on a support [3]. This new generation of precision polymers is promising for a wide range of applications and, in particular, for the development of information-containing macromolecules. In such materials, information is stored at the molecular level in the form of a coded monomer sequence and can be recovered using a sequencing technique. Some types of information-containing macromolecules have already been reported [4,5], but their molecular structures differ markedly from those of standard commodity polymers.

Some routes for preparing sequence-defined oligocarbamates have already been reported in the literature but they involve protecting-group-based protocols inspired by solid-phase peptide synthesis [6-8].

Accordingly, It may be beneficial to have sequence-defined classical plastics such as PUs, that finds applications notably for information storage. Methods for readily synthesizing such polymers also are needed, such as methods implementing readily available starting materials. It may be beneficial to have PUs that address or overcome the structural, and hence functional, limitations associated with current synthetically-accessible PUs. It may be beneficial to have more diverse PU structures that can be readily synthesized, where a diversity of side chain structures can be incorporated onto the polymer chain, where the length of the polymer is defined, and where the sequence of monomers can be defined in a predetermined fashion. It may be beneficial to have such sequence-defined PUs such that the backbone and side chain structures may provide for intramolecular and/or intermolecular interactions that determine macromolecular conformation and/or self-assembly into materials. Discussed herein are novel PU structures different from peptides, peptoids, nucleic acids, or other related art sequence-defined polymers, methods for readily synthesizing such polymers, and methods that can be implemented from readily available starting materials.

DEFINITIONS

Figure 1:
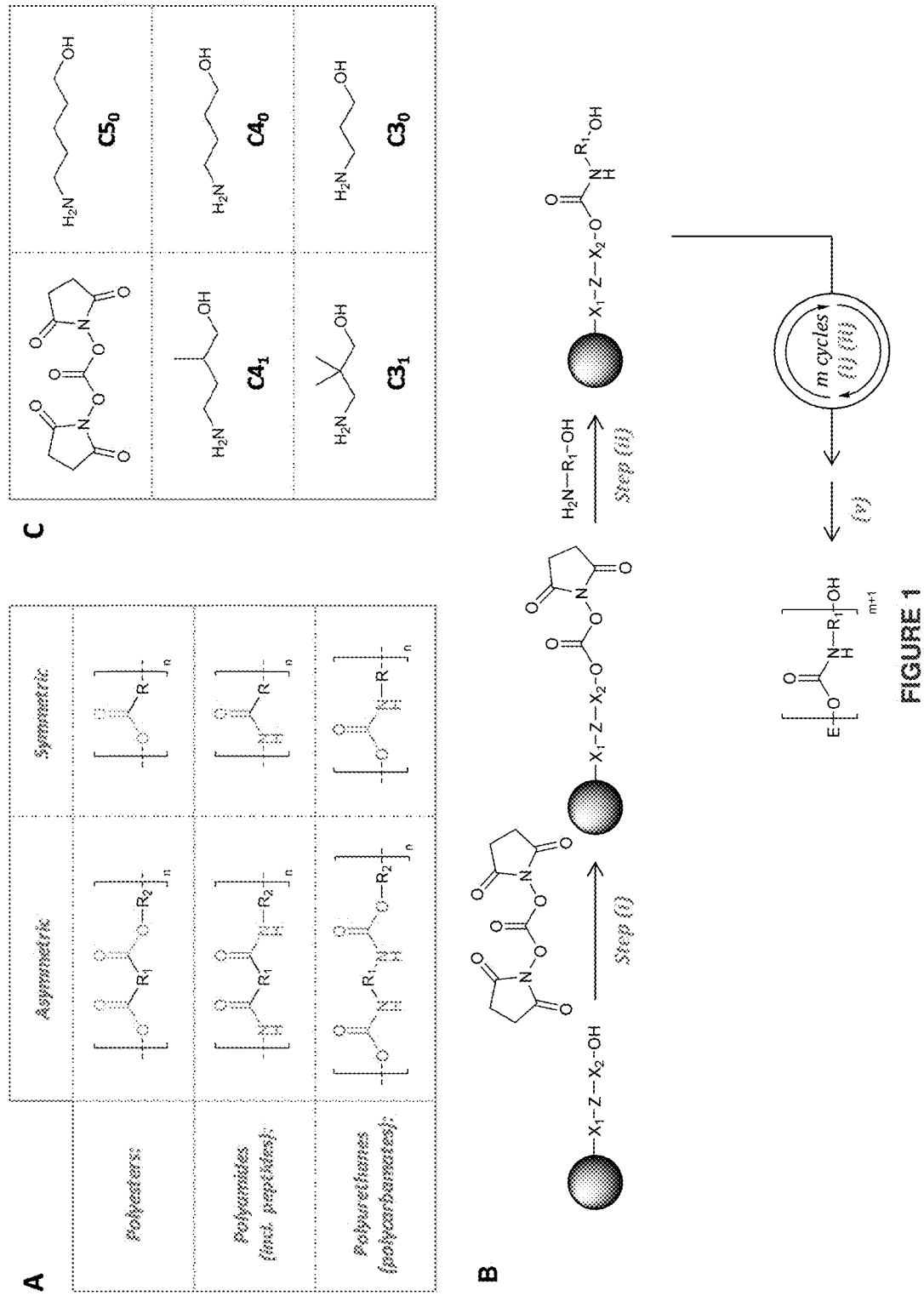
FIG. 1 depicts (A) Classification of some related art commodity polymers. (B) Exemplary chemoselective iterative strategy investigated herein for the synthesis of uniform polyurethanes. The beige hemispheres denotes a crosslinked polystyrene resin bead. Experimental conditions: (i) triethylamine, ACN, microwave, 60° C.; (ii) DMF, RT; (iii) Cleavage: TFA/DCM, RT. (C) Molecular structure of exemplary monomers studied as part of some embodiments.

In general the terms and phrases used herein have their art-recognized meaning, which can be found by reference to standard texts, journal references and contexts known to those of ordinary skill in the art. The specific definitions are provided to clarify their specific use in the context of some embodiments.

It is understood that the polyurethanes, as described herein, may be substituted with any number of substituents or functional moieties, notably on their side-chains. In general, the term "substituted" whether preceded by the term "optionally" or not, and substituents contained in formulas of some embodiments, refer to the replacement of hydrogen radicals in a given structure with the radical of a specified substituent. When more than one position in any given structure may be substituted with more than one substituent selected from a specified group, the substituent may be either the same or different at every position. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic, carbon and heteroatom substituents of organic compounds. For purposes of some embodiments, heteroatoms such as nitrogen may have hydrogen substituents and/or any permissible substituents of organic compounds described herein which satisfy the valencies of the heteroatoms. Furthermore, some embodiments are not intended to be limited in any manner by the permissible substituents of organic compounds. Examples of substituents include, but are not limited to aliphatic; heteroaliphatic; alicyclic; heteroalicyclic; aromatic, heteroaromatic; aryl; heteroaryl; alkylaryl; alkylheteroaryl; alkoxy; aryloxy; heteroalkoxy; heteroaryloxy; alkylthio; arylthio; heteroalkylthio; heteroarylthio; F; Cl; Br; I; —NO$_2$; —CN; —N$_3$; alkynyl; allyl; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —or -GR$^{G1}$ wherein G is —O—, —S—, —NR$^{G2}$—, —C(=O)—, —S(=O)—, —SO$_2$—, —C(=O)O—, —C(=O)NR$^{G2}$, —OC(=O)—, —NR$^{G2}$C(=O)—, —OC(=O)O—, —OC(=O)NR$^{G2}$—, —NR$^{G2}$C(=O)O—, —NR$^{G2}$C(=O)NR$^{G2}$—, —C(=S)—, —C(=S)S—, —SC(=S)—, —SC(=S)S—, —C(=NR$^{G2}$)—, —C(=NR$^{G2}$)O—, —C(=NR$^{G2}$)NR$^{G3}$—, —OC(=NR$^{G2}$)—, —NR$^{G2}$C(=NR$^{G3}$)—, —NR$^{G2}$SO$_2$—, —NR$^{G2}$SO$_2$NR$^{G3}$—, or —SO$_2$NR$^{G2}$—, wherein each occurrence of R$^{G1}$, R$^{G2}$ and R$^{G3}$ independently includes, but is not limited to, hydrogen, halogen, or an optionally substituted aliphatic, heteroaliphatic, alicyclic, heteroalicyclic, aromatic, heteroaromatic, aryl, heteroaryl, alkylaryl, or alkylheteroaryl moiety. Additional examples of generally applicable substituents are illustrated by the specific embodiments shown in the Examples that are described herein.

The following explanations of terms are provided to better describe some embodiments and to guide those of ordinary skill in the art in the practice of some embodiments. As used herein, the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of some embodiments, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/ methods. When directly and explicitly distinguishing embodiments from discussed related art, the embodiment numbers are not approximates unless the word "about" is recited. Furthermore, not all alternatives recited herein are equivalents.

To facilitate review of the various embodiments of the disclosure, the following explanations of specific terms are provided:

The term "aliphatic", as used herein, includes both saturated and unsaturated, straight chain (i.e., unbranched) or branched aliphatic hydrocarbons, which are optionally substituted with one or more functional groups. The term encompasses hydrocarbons, or a radical thereof, having at least one carbon atom to 50 carbon atoms, such as one to 25 carbon atoms, or one to ten carbon atoms, and which includes alkanes (or alkyl), alkenes (or alkenyl), alkynes (or alkynyl), including cyclic versions thereof, and further including straight- and branched-chain arrangements, and all stereo and position isomers as well. As will be appreciated by one of ordinary skill in the art, "aliphatic" is intended herein to include, but is not limited to, alkyl, alkenyl, alkynyl moieties.

The term "alkyl", as used herein, refers to a saturated monovalent hydrocarbon having at least one carbon atom to 50 carbon atoms, such as one to 25 carbon atoms, or one to ten carbon atoms, or one to six carbon atoms, wherein the saturated monovalent hydrocarbon can be derived from removing one hydrogen atom from one carbon atom of a parent compound (e.g., alkane). An alkyl group can be branched, straight-chain, or cyclic (e.g., cycloalkyl). Advantageously, as used herein, "lower alkyl" is used to indicate those alkyl groups (substituted, unsubstituted, branched or unbranched) having about 1-6 carbon atoms. Illustrative alkyl groups thus include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like.

The term "alkenyl", as used herein, refers to an unsaturated monovalent hydrocarbon having at least two carbon atoms 50 carbon atoms, such as two to 25 carbon atoms, or two to ten carbon atoms, or one to six carbon atoms, and at least one carbon-carbon double bond, wherein the unsaturated monovalent hydrocarbon can be derived from removing one hydrogen atom from one carbon atom of a parent alkene. An alkenyl group can be branched, straight-chain, cyclic (e.g., cylcoalkenyl), cis, or trans (e.g., E or Z). Alkenyl groups include, but are not limited to, for example, ethenyl, propenyl, butenyl, 1-methyl-2-buten-1-yl, and the like.

The term "alkynyl", as used herein, refers to an unsaturated monovalent hydrocarbon having at least two carbon atoms 50 carbon atoms, such as two to 25 carbon atoms, or two to ten carbon atoms or one to six carbon atoms, and at least one carbon-carbon triple bond, wherein the unsaturated monovalent hydrocarbon can be derived from removing one hydrogen atom from one carbon atom of a parent alkyne. An alkynyl group can be branched, straight-chain, or cyclic (e.g., cycloalkynyl). Representative alkynyl groups include, but are not limited to, ethynyl, 2-propynyl (propargyl), 1-propynyl and the like.

The term "cycloalkyl", as used herein, refers specifically to cyclic alkyl groups having three to seven, advantageously or preferably three to ten carbon atoms. Suitable cycloalkyls include, but are not limited to cyclopropyl, cyclobutyl, cyclopentyl, cyclohexyl, cycloheptyl and the like, which, as in the case of aliphatic, heteroaliphatic or heterocyclic moieties, may optionally be substituted. An analogous convention applies to other generic terms such as "cycloalkenyl", "cycloalkynyl" and the like.

The term "Aliphatic-aryl", as used herein, refers to an aryl group that is or can be coupled to a starting material, monomer, or polyurethane embodiment disclosed herein, wherein the aryl group is or becomes coupled through an aliphatic group.

An analogous convention applies to other generic terms such as Alkylaryl/Alkenylaryl/Alkynylaryl: An aryl group that is or can be coupled to a starting material, monomer, or polyurethane embodiment disclosed herein, wherein the aryl group is or becomes coupled through an alkyl, alkenyl, or alkynyl group, respectively.

The term "Aliphatic-heteroaryl", as used herein, refers to a heteroaryl group that is or can be coupled to a starting material, monomer, or polyurethane embodiment disclosed herein, wherein the heteroaryl group is or becomes coupled through an aliphatic group.

An analogous convention applies to other generic terms such as Alkylheteroaryl/Alkenylheteroaryl/Alkynylheteroaryl: A heteroaryl group that is or can be coupled to a starting material, monomer, or polyurethane embodiment disclosed herein, wherein the heteroaryl group is or becomes coupled through an alkyl, alkenyl, or alkynyl group, respectively.

The term "Alkoxy", as used herein, refers to a moiety —O-alkyl, with exemplary embodiments including, but not limited to, methoxy, ethoxy, n-propoxy, isopropoxy, n-butoxy, t-butoxy, sec-butoxy, n-pentoxy, n-hexoxy.

The term "heteroaliphatic", as used herein, refers to aliphatic moieties in which one or more carbon atoms in the main chain have been substituted with a heteroatom. Thus, a heteroaliphatic group refers to an aliphatic chain which contains one or more oxygen, sulfur, nitrogen, phosphorus or silicon atoms, i.e., in place of carbon atoms, for example, at least one heteroatom to 20 heteroatoms, such as one to 15 heteroatoms, or one to 5 heteroatoms, or one, two, three or four heteroatoms. Thus, a 1-6 atom heteroaliphatic linker having at least one N atom in the heteroaliphatic main chain, as used herein, refers to a $C_{1-6}$ aliphatic chain wherein at least one carbon atom is replaced with a nitrogen atom, and wherein any one or more of the remaining 5 carbon atoms may be replaced by an oxygen, sulfur, nitrogen, selenium, phosphorus or silicon atom, and oxidized forms thereof within the group. As used herein, a 1-atom heteroaliphatic linker having at least one N atom in the heteroaliphatic main chain refers to —NH— or —NR— where R is aliphatic, heteroaliphatic, acyl, aromatic, heteroaromatic or a nitrogen protecting group. Heteroaliphatic moieties may be branched or linear unbranched.

An analogous convention applies to other generic terms such as Heteroalkyl/Heteroalkenyl/Heteroalkynyl: An alkyl, alkenyl, or alkynyl group (which can be branched, straight-chain, or cyclic) including at least one heteroatom to 20 heteroatoms, such as one to 15 heteroatoms, or one to 5 heteroatoms, or one, two, three or four heteroatoms, which can be selected from, but not limited to oxygen, nitrogen, sulfur, selenium, phosphorous, silicon, and oxidized forms thereof within the group.

The term "heteroalicyclic", "heterocycloalkyl" or "heterocyclic", as used herein, refers to compounds which combine the properties of heteroaliphatic and cyclic compounds and include but are not limited to saturated and unsaturated mono- or polycyclic heterocycles such as morpholino, pyrrolidinyl, furanyl, thiofuranyl, pyrrolyl etc. Advantageously, the term "heterocyclic" refers to a non-aromatic 5-, 6- or 7-membered ring or a polycyclic group, including, but not limited to a bi- or tri-cyclic group including fused six-membered rings having between one and three heteroatoms independently selected from oxygen, sulfur and nitrogen, wherein (i) each 5-membered ring has 0 to 2 double bonds and each 6-membered ring has 0 to 2 double bonds, (ii) the nitrogen and sulfur heteroatoms may optionally be oxidized, (iii) the nitrogen heteroatom may optionally be quaternized, and (iv) any of the above heterocyclic rings may be fused to an aryl or heteroaryl ring. Representative heterocycles include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl.

In general, the term "aromatic moiety", as used herein, refers to stable substituted or unsubstituted unsaturated mono- or polycyclic hydrocarbon moieties having advantageously or preferably 3-14 carbon atoms, including at least one ring satisfying the Huckel rule for aromaticity. Examples of aromatic moieties include, but are not limited to, phenyl, indanyl, indenyl, naphthyl, phenanthryl and anthracyl.

In general, the term "heteroaromatic moiety", as used herein, refers to stable substituted or unsubstituted unsaturated mono-heterocyclic or polyheterocyclic moieties having advantageously or preferably 3-14 carbon atoms, including at least one ring satisfying the Huckel rule for aromaticity. Examples of heteroaromatic moieties include, but are not limited to, pyridyl, quinolinyl, dihydroquinolinyl, isoquinolinyl, quinazolinyl, dihydroquinazolyl, and tetrahydroquinazolyl.

In general, the term "aryl" refers to aromatic moieties as described above, having a single ring or multiple condensed rings, which condensed rings can or may not be aromatic provided that the point of attachment is through an atom of the aromatic carbocyclic group. Advantageously, "aryl" refers to a mono- or bicyclic carbocyclic ring system having one or two rings satisfying the Huckel rule for aromaticity, including, but not limited to, phenyl, naphthyl, tetrahydronaphthyl, indanyl, indenyl and the like.

Similarly, the term "heteroaryl" refers to heteroaromatic moieties, as described above, having a single ring or multiple condensed rings, which condensed rings can or may not be aromatic provided that the point of attachment is through an atom of the aromatic carbocyclic group. Advantageously, the term "heteroaryl", as used herein, refers to a cyclic unsaturated radical having from about five to about ten ring atoms of which one ring atom is selected from S, O and N; zero, one or two ring atoms are additional heteroatoms independently selected from S, O and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, triazolyl, oxazolyl, isooxazolyl, thiadiazolyl, oxadiazolyl, thiophenyl, furanyl, quinolinyl, isoquinolinyl, and the like.

The term "Heteroaliphatic-aryl", as used herein, refers to an aryl group that is or can be coupled to a starting material, monomer, or polyurethane embodiment disclosed herein, wherein the aryl group is or becomes coupled through a heteroaliphatic group.

An analogous convention applies to other generic terms such as Heteroalkylaryl/Heteroalkenylaryl/Heteroalkynylaryl: An aryl group that is or can be coupled to a starting material, monomer, or polyurethane embodiment disclosed herein, wherein the aryl group is or becomes coupled through a heteroalkyl, heteroalkenyl, or heteroalkynyl group, respectively.

An analogous convention applies to other generic terms such as Heteroalkylheteroaryl/Heteroalkenylheteroaryl/Heteroalkynylheteroar-yl: A heteroaryl group that is or can be coupled to a starting material, monomer, or polyurethane embodiment disclosed herein, wherein the aryl group is or becomes coupled through a heteroalkyl, heteroalkenyl, or heteroalkynyl group, respectively.

The term "amine" refers to a group having the structure —N(R)2 wherein each occurrence of R is independently hydrogen, alkyl, alkenyl, alkynyl, aryl, heteroalkyl, heteroalkenyl, heteroalkynyl, heteroaryl, and any combination thereof, or the R groups, taken together, may form a heterocyclic moiety.

The terms "halo" and "halogen" as used herein refer to an atom selected from fluorine, chlorine, bromine and iodine. The term "halogenated" denotes a moiety having at least one halogen atom attached thereto.

The term "haloalkyl" denotes an alkyl group, as defined above, wherein one or more hydrogen atoms, such as one to 10 hydrogen atoms, independently is replaced with a halogen atom and is exemplified by such groups as chloromethyl, bromoethyl, trifluoromethyl, and the like.

The term "Heteropolymer" or "heteropolyurethane", as used herein, refers to a polymer/polyurethane including multiple different monomer units, wherein the multiple different monomer units are be distinguished by a side chain $R_{1,4}$, a linker group $R_1$, a $R_2$ group, or a combination thereof and at least two monomer units are not the same. In particular disclosed embodiments, a heteropolymer is linear and is not, and does not constitute, a dendrimer. Such dendrimers include or consist of multiple branches, rather than just one branching point.

The term "Homopolymer" or "homopolyurethane", as used herein, refers to a polymer/polyurethane including identical monomer units and that is uniform or substantially uniform. In independent embodiments, the homopolymer is linear and is not, and does not constitute, a dendrimer. Such dendrimers include or consist of multiple branches, rather than just one branching point.

The term "uniform" or "monodisperse", as used herein, refers to a polyurethane as contemplated by some embodiments which is composed of molecules uniform with respect to relative molecular mass and constitution. Generally, a uniform polyurethane contemplated by some embodiments refers to a polyurethane wherein the final polyurethane product contains mainly polymer chains having the desired sequence, as dictated by the sequencial reaction steps of the polyurethane synthesis (sequencial attachment of selected monomers in a specific order). In other words, in the broadest sense, a uniform polyurethane contemplated by some embodiments encompasses final polyurethane product wherein >50%, ≥60%, ≥70%, or ≥80% of the polymer chains have the desired sequence, as dictated by the sequencial reaction steps of the polyurethane synthesis. In advantageous or preferred embodiments, a uniform polyurethane refers to a polyurethane wherein the length (or number of monomer units) obtained in a final polyurethane product is defined by a specific number of starting materials, molecular precursors, or submonomers attached during synthesis of the polymer and substantially all the polymer chains (e.g., ≥95%, ≥96%, ≥97%, ≥98% or ≥99% of the polymer chains) are of the same length defined by the synthesis. As an example, in a method embodiment wherein 6 starting material units are combined to form a polyurethane, at least 90% of the polymer chains include or consist of exactly 6 monomer units.

The term "sequence-defined polyurethane", as used herein, refers to a heteropolyurethane including at least two monomers, wherein each monomer can have a different side chain $R_{1,4}$, linker group $R_1$, and/or $R_2$ group, and wherein the monomers are arranged in a pre-determined specific sequence, with the pre-determined specific sequence being determined prior to synthesis of the heteropolyurethane.

The term "Solid Support", as used herein, refers to a solid, inorganic or organic material that is appended (typically via covalent bond) to one end of a molecular precursor, monomer, or polymer disclosed herein, that allows to carry out the synthesis of polyurethanes of some embodiments using solid-phase synthesis techniques, and that typically is inert to the reaction conditions used to form the polymer chain thereby allowing the solid support to remain attached to the growing polymer chain. The solid support can be selectively cleaved to free the polymer. Solid supports are well known in the art, and may be selected from any related art support used in the field of immobilized polymer synthesis.

The term "Soluble Support", as used herein, refers to an inorganic or organic material that is appended (typically via covalent bond) to one end of a molecular precursor, monomer, or polymer disclosed herein, that allows to carry out the synthesis of polyurethanes of some embodiments using liquid-phase synthetic techniques, and that typically is inert to the reaction conditions used to form the polymer chain thereby allowing the soluble support to remain attached to the growing polymer chain. In other words, a "soluble support" refers to a support that is soluble in the solvent system used to carry out the iterative polymer synthesis. Advantageously or preferably, the soluble support is soluble in most organic solvents, and possibly may impart solubility onto the polymer chain attached to it, to allow reactions to be performed and monitored in the homogeneous phase. Advantageously or preferably, a soluble support may be prone to crystallization, or at least precipitation, under well-defined experimental conditions to allow the handling of a solid material during the work-up and purification stages. Suitable experimental conditions for crystallization or precipitation are well known to the person of ordinary skill in the art. Such "soluble support" has the advantages of allowing both solution- and solid-phase synthesis in the different steps of the synthesis. The soluble support can be selectively cleaved to free the polymer. Examples of soluble supports useable in the context of some embodiments include linear homopolymers such as polystyrene, poly (ethylene glycol) and poly(vinyl alcohol). Typically, linear polystyrene supports are soluble in organic solvents such as THF, toluene, xylene and anisole, and are insoluble (and therefore can be precipitated) in solvents such as methanol, alkanes, and petroleum ethers. Likewise, suitable solvents or solvent systems for solubilizing or precipitating poly(ethylene glycol)-type and poly(vinyl alcohol)-type supports are known in the art. The person of ordinary skill in the art will know how to select the proper solvent system, based on the type of soluble support used to carry out some embodiments. The use of soluble supports allows for selective precipitations of the growing polyurethane over all other reagents used in the polyurethane synthetic iterative process. Soluble supports are well known in the art, and may be selected from any related art support used in the field of immobilized polymer synthesis.

As used herein, the expression "solid or soluble support" means "solid support or soluble support" suitable for stepwise immobilized-polymer synthesis, as each term is defined above.

Advantageously, the support suitable for stepwise immobilized-polymer synthesis, which may be a solid or soluble support, in the context of some embodiments may bear a cleavable tether including a cleavable covalent bond. For example, the cleavable covalent bond may be a disulfide (S—S) or ester (—C(=O)O—) group. Advantageously, the solid or soluble support in the context of some embodiments may additionally or alternatively bear, or may be chemically functionalized to bear, functional groups that allow covalent binding of (i) a tether moiety and/or (ii) a molecular precursor, monomer, or polymer disclosed herein on the surface of the solid or soluble support. For example, the solid or soluble support in the context of some embodiments may additionally or alternatively bear or may be chemically functionalized to bear, hydroxyl functional groups on its surface (for example a Wang resin (4-benzyloxybenzyl alcohol polystyrene) may be used as solid support). Advantageously, the solid or soluble support in the context of some embodiments may bear cleavable tether moieties having the structure —$X_1$—Z—$X_2$—OH, covalently bound on its surface, where $X_1$, Z and $Z_2$ are defined in some embodiments. Advantageously, Z may be a disulfide (S—S) or ester (—C(=O)O—) group, advantageously or preferably —C(=O)O—.

A person of ordinary skill in the art will recognize that the definitions provided above are not intended to include impermissible substitution patterns (e.g., methyl substituted with 5 different groups, and the like). Such impermissible substitution patterns are easily recognized by a person of ordinary skill in the art. Any functional group disclosed herein and/or defined above can be substituted or unsubstituted, unless otherwise indicated herein. Also, in some embodiments, the use of the terms "(hetero)aliphatic," "(hetero)alkyl," "(hetero)alkenyl," "(hetero)alkynyl," "(hetero)aryl," "(hetero)aliphatic(hetero)aryl," "(hetero)alkyl(hetero)aryl," "(hetero)alkenyl(hetero)aryl," "(hetero)alkynyl(hetero)aryl", "(hetero)aliphatic(hetero)aryl(hetero)aliphatic," "(hetero)alkyl(hetero)aryl(hetero)alkyl," "(hetero)alkenyl(hetero)aryl(hetero)alkenyl," "(hetero)alkynyl(hetero)aryl(hetero)alkynyl" can be used to indicate that the functional group can be a heteroatom-containing or a non-heteroatom-containing version of the particular designated aliphatic, alkyl, alkenyl, alkynyl, aryl, aliphaticaryl, alkylaryl, alkenylaryl, alkynylaryl, aliphaticarylaliphatic, alkylarylalkyl, alkenylarylalkenyl, and/or alkynylarylalkynyl group. For example, "(hetero)alkyl" can encompass "heteroalkyl" or "alkyl" unless otherwise specifically indicated. Likewise, "(hetero)alkyl(hetero)aryl can encompass "alkylaryl", "alkylheteroaryl", "heteroalkylaryl" and "heteroalkylheteroaryl" unless otherwise specifically indicated.

As used herein, "including" is synonymous with "containing" or "characterized by," and is inclusive or open-ended and does not exclude additional, unrecited elements or method steps. As used herein, "including or consisting of" excludes any element, step, or ingredient not specified in the claim element. As used herein, "including or consisting essentially of" does not exclude materials or steps that do not materially affect the basic and novel characteristics of the claim. Any recitation herein of the term "including", particularly in a description of components of a composition or in a description of elements of a device, is understood to encompass those compositions and methods including or consisting essentially of and including or consisting of the recited components or elements. Some embodiments illustratively described herein suitably may be practiced in the absence of any element or elements, limitation or limitations which is not specifically disclosed herein.

When a group of substituents is disclosed herein, it is understood that all individual members of those groups and all subgroups, including any isomers and enantiomers of the group members, and classes of molecules that can be formed using the substituents are disclosed separately. When a molecule is claimed, it should be understood that molecules known in the art including the molecules disclosed in the references disclosed herein are not intended to be included. In particular, it should be understood that any molecule for which an enabling disclosure is provided in any reference cited in this specification is to be excluded from the claims herein if appropriate. When a Markush group or other grouping is used herein, all individual members of the group and all combinations and subcombinations possible of the group are intended to be individually included in the disclosure. Unless otherwise indicated, when a molecule is described and/or claimed herein, it is intended that any ionic forms of that molecule, particularly carboxylate anions and protonated forms of the molecule as well as any salts thereof are included in the disclosure. Counter anions for salts include among others halides, carboxylates, carboxylate derivatives, halogenated carboxylates, sulfates and phosphates. Counter cations include among others alkali metal cations, alkaline earth cations, and ammonium cations.

DETAILED DESCRIPTION OF EXEMPLARY EMBODIMENTS

Disclosed herein are novel synthetic polyurethanes with diverse side chain functional groups whose unique, defined structures lead to properties and functionality lending to their use in information storage and anti-counterfeiting prevention.

Disclosed herein is a novel method for preparing these uniform sequence-defined polyurethanes.

Embodiments of the presently disclosed method utilize the starting materials to provide a molecular architecture with reactive sites that can be sequentially acted upon in a pre-determined, well-controlled manner to create the desired polyurethanes.

Advantageously, the polyturethanes of some embodiments are uniform sequence-defined polyurethanes. They may be prepared by a strategy relying on the use of two successive chemoselective steps as shown below:

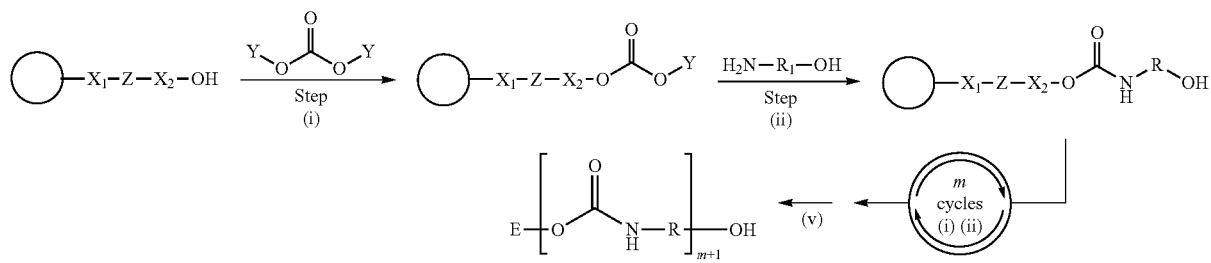

Accordingly, in one aspect, there is provided a method of preparing a linear uniform polyurethane, including steps of:

(i) covalently coupling a suitable support for stepwise immobilized-polymer synthesis, bearing a cleavable tether moiety —$X_1$—Z—$X_2$—OH at its surface, with a carbonate compound having the structure:

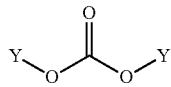

wherein each occurrence of Y is independently a succinimidyl or pyridyl moiety;

$X_1$ and $X_2$ independently represent a covalent bond or represents a $C_{1-20}$ aliphatic, $C_{1-20}$heteroaliphatic, $C_{6-10}$aryl, $C_{1-20}$ aliphatic-$C_{6-10}$aryl, $C_{1-20}$heteroaliphatic-$C_{6-10}$aryl, $C_{3-10}$heteroaryl, $C_{1-20}$ aliphatic-$C_{3-10}$heteroaryl, or $C_{1-20}$heteroaliphatic-$C_{3-10}$heteroaryl spacer group;

Z represents a functional group that is responsively cleavable under suitable conditions that are different from the reaction conditions used in steps (i) through (iv);

to form an adduct having the structure:

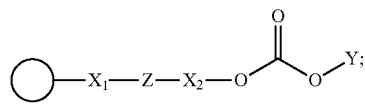

(ii) covalently coupling the adduct obtained in step (i) with a second compound having the structure $R_2HN$—$R_1$—OH wherein $R_1$ is a $C_{1-20}$ aliphatic, $C_{1-20}$heteroaliphatic, $C_{1-20}$(hetero)aliphatic-$C_{6-10}$aryl-$C_{1-20}$(hetero)aliphatic, or $C_{1-20}$(hetero)aliphatic-$C_{3-10}$heteroaryl-$C_{1-20}$(hetero)aliphatic moiety wherein each of the foregoing aliphatic or heteroaliphatic moieties may be linear, branched or cyclic and saturated or unsaturated; and $R_2$ is H or a $C_{1-20}$ aliphatic, $C_{1-20}$heteroaliphatic, $C_{1-20}$(hetero)aliphatic-$C_{6-10}$aryl-$C_{1-20}$(hetero)aliphatic, or $C_{1-20}$(hetero)aliphatic-$C_{3-10}$heteroaryl-$C_{1-2}$(hetero)aliphatic moiety wherein each of the foregoing aliphatic or heteroaliphatic moieties may be linear, branched or cyclic and saturated or unsaturated; to form a second adduct having the structure:

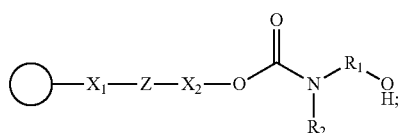

(iii) repeating steps (i) and (ii) as many times as desired, wherein the adduct obtained from step (ii) of iteration m-1 is used as support for stepwise immobilized-polymer synthesis for step (i) of iteration m; and wherein

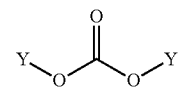

and $R_2NH$—$R_1$—OH may be the same as or different from those used in previous iterations to form a polyurethane having the structure:

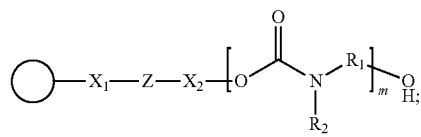

wherein m represents the number of iterations, and m is an integer from 2-1000;

(iv) optionally, in the last iteration of step (ii), covalently coupling the adduct obtained in the preceding step (i) with an amino-functionalized compound having the structure $R_2HN$—$R_1$-$E''$ wherein $R_1$ and $R_2$ are as defined above and $E''$ represents a $C_{1-20}$ aliphatic, $C_{1-20}$heteroaliphatic, $C_{6-10}$aryl, $C_{1-20}$ aliphatic-$C_{6-10}$aryl, $C_{1-20}$heteroaliphatic-$C_{6-10}$aryl, $C_{3-10}$heteroaryl, $C_{1-20}$ aliphatic-$C_{3-10}$heteroaryl, or $C_{1-20}$heteroaliphatic-$C_{3-10}$heteroaryl moiety wherein each of the foregoing aliphatic or heteroaliphatic moieties may be linear, branched or cyclic and saturated or unsaturated; to form a polyurethane having the structure:

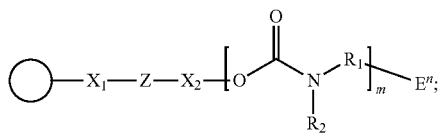

and (v) optionally cleaving the responsively cleavable functional group Z binding the polyurethane to the support for stepwise immobilized-polymer synthesis, under suitable conditions;

to form a uniform sequence defined polyurethane having a formula:

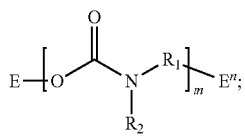

wherein

E is a terminal group selected from H, a $C_{1-20}$ aliphatic, $C_{1-20}$heteroaliphatic, $C_{6-10}$aryl, $C_{1-20}$ aliphatic-$C_{6-10}$aryl, $C_{1-20}$heteroaliphatic-$C_{6-10}$aryl, $C_{3-10}$heteroaryl, $C_{1-20}$ aliphatic-$C_{3-10}$heteroaryl, or $C_{1-20}$heteroaliphatic-$C_{3-10}$heteroaryl moiety, or a moiety that is or includes a the support for stepwise immobilized-polymer synthesis used in step (i);

E" is a terminal group selected from OH, a $C_{1-20}$ aliphatic, $C_{1-20}$heteroaliphatic, $C_{6-10}$aryl, $C_{1-20}$ aliphatic-$C_{6-10}$aryl, $C_{1-20}$heteroaliphatic-$C_{6-10}$aryl, $C_{3-10}$heteroaryl, $C_{1-20}$ aliphatic-$C_{3-10}$heteroaryl, or $C_{1-20}$heteroaliphatic-$C_{3-10}$heteroaryl moiety;

wherein each of the foregoing aliphatic or heteroaliphatic moieties may be linear, branched or cyclic and saturated or unsaturated.

The support for stepwise immobilized-polymer synthesis may be solid or soluble in the reaction conditions used over steps (i) through (v). As such, it may be referred to herein as "solid or soluble support".

As used herein, the term "responsively cleavable", when referring to a chemical bond or linking group, refers to a covalent bond, or linking group that is cleaved upon application of a specific trigger/signal. The trigger/signal can be, for example, a specific chemical reaction, a change in pH (either an increase or decrease), a change in redox potential, the presence of reduction or oxidation agent, the presence of UV, visible or near infrared light, ultrasounds, electromagnetic radiation, a change in temperature, etc.

In general, the cleavage point on the responsively cleavable functional group Z can be any labile covalent bond that can be specifically cleaved under chemical conditions or using a physical trigger such as light or temperature. For example, chemically cleavable functional groups Z include labile carboxylic esters (—O—C(═O)—) and disulfides (—S—S—), in which the cleavable bond is the covalent bond between O and C(═O), and between the two S atoms, respectively, which may be cleaved under suitable conditions. For example classical linkers for peptide synthesis such as Wang or Rink linkers, or chemically modified versions thereof (see Examples), can be used as —$X_1$—Z—$X_2$—. As will be readily understood, when the cleavable functional group Z is said to be a carboxylic ester, the nature of $X_1$ and $X_2$ is such that they do not change the carboxylic ester nature of Z (in other words, in the tether —$X_1$—OC(═O)—$X_2$—, $X_1$ and $X_2$ are bound to —OC(═O)— via a carbon atom other than C═O or C═S so that —$X_1$—OC(═O)—$X_2$— remains a carboxylic ester, not another carboxyl-containing functional group such as a carbonate or carbamate). Likewise, when the cleavable functional group Z is said to be a disulfide, the nature of $X_1$ and $X_2$ is such that they do not change the disulfide nature of Z (in other words, in the tether —$X_1$—SS—$X_2$—, $X_1$ and $X_2$ are bound to the disulfide —SS— via a carbon atom other than C═O or C═S so that —$X_1$—S—S—$X_2$— remains a disulfide, not another —SS-containing functional group such as a dithioperoxoate moiety (R—SS—C(═O)R')).

When Z is a disulfide functional group, its cleavage may be chemically triggered using a suitable reducing agent (e.g., $NaBH_4$, dithiothreitol (DTT), glutathione).

When Z is a carboxylic ester functional group, its cleavage may be chemically triggered using suitable basic or acidic conditions.

The nature of the terminal group E will depend on the type of cleavable tether used on the support. In exemplary embodiments, if the polyurethane product is not cleaved from the solid or soluble support, E may represent

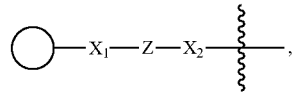

wherein $X_1$, Z and $X_2$ are as defined in the different embodiments and variants described herein. In other exemplary embodiments, if the polyurethane product is cleaved from the solid or soluble support, E may represent

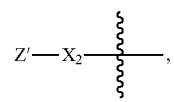

wherein Z' represents the residual functional group resulting from the cleavage of Z. For example, E may represent HS—$X_2$— or $HO_2C$—$X_2$— when Z represents a disulfide (—S—S—) or carboxylic ester (—O—C(═O)—) group, respectively; provided that $X_2$ is bound to the —SH or —$CO_2H$ moiety, respectively, via a carbon atom other than C═O or C═S.

The white circles

represent a suitable support for stepwise synthesis, in particular stepwise/iterative immobilized-polymer synthesis. The method is applicable on any solid or soluble support bearing OH groups at its surface. The OH group may be present on a cleavable tether —$X_1$—Z—$X_2$—. The support may be a crosslinked resin bead for solid-phase iterative chemistry (e.g. crosslinked poly(styrene-co-divinylbenzene), a hard sphere (e.g. magnetic bead), a planar surface (e.g. glass surface, silicon wafer) or a soluble support for liquid-phase chemistry (e.g. soluble polymer chain, fluorous tag). Advantageously, the support contains a cleavable tether —$X_1$—Z—$X_2$— allowing cleavage of the polyurethane after stepwise synthesis. The nature of the terminal group E will depend on the type of cleavable tether used on the support.

For example, the support may be a hydroxy-functionalized polystyrene resin (e.g., Hydroxymethyl Polystyrene Resins, Hydroxyethyl Polystyrene Resins, Hydroxybutyl Polystyrene Resins, 4-(Hydroxymethyl)phenoxymethyl Polystyrene Resin, 4-(Hydroxymethyl)phenoxyethyl Polystyrene Resin, 4-(Hydroxymethyl)phenoxybutyl Polystyrene Resin, 4-(Hydroxymethyl)phenoxyacetylamidomethyl Polystyrene Resin, 4-(Hydroxymethyl)phenoxyacetylamidoethyl Polystyrene Resin, 4-(Hydroxymethyl)benzoylamidomethyl Polystyrene Resin, 4-(Hydroxymethyl)benzoyllamidoethyl Polystyrene Resin, Hydroxytrityl Polystyrene Resin), a hydroxyl-functionalized TentaGel® Resin (e.g., TentaGel® S OH Standard TentaGel Resins, TentaGel® R OH TentaGel Research Resins, TentaGel® HL OH High loaded TentaGel Resins, TentaGel® MB OH TentaGel Macrobead Resins, TentaGel® Diol, 4-(Hydroxymethyl)phenoxyethyl TentaGel® Resins (Wang Type Resins), 3-Methoxy-4-(Hydroxymethyl) Phenoxyacetylamidoethyl TentaGel® Resins, 4-(Hydroxymethyl)phenoxyacetylamidoethyl TentaGel® XV (HMPA Resins), 4-(Hydroxymethyl) benzoylamidoethyl TentaGel® (HMBA Resins), Hydroxytrityl TentaGel® S Resins, Hydroxytrityl TentaGel® HL Resins, Hydroxytrityl TentaGel® MB Resins), or hydroxyl-functionalized HypoGel® Resins (e.g., HypoGel® Diol, Trt-HypoGel® Resins).

The support may be a resin with Acid Labile Linkers, such as resins for Amine and Amide Terminated Compounds (e.g., Rink-Amide Linker on Aminomethyl Polystyrene Resins, Rink-Amide Linker on Aminoethyl Polystyrene Resins, Rink-Amide Linker on TentaGel® Resins, Rink-Amide Linker on HypoGel® Resins), resins for Carboxy Terminated Compounds (e.g., Polystyrene Wang Resin (4-Hydroxybenzyl Alcohol, PHB, Wang linker), PHB TentaGel® Resins (4-Hydroxybenzyl Alcohol, PHB, Wang Linker), PHB HypoGel® Resins (4-Hydroxybenzyl Alcohol, PHB, Wang Linker), HMPA Polystyrene Resins (4-Hydroxymethylphenoxyacetyl Linker), HMPA TentaGel® XV Resins (4-Hydroxymethylphenoxyacetyl Linker), AC TentaGel® Resins (3-Methoxy-4-(Hydroxymethyl) Phenoxyacetyl Linker)).

TentaGel® resins are grafted copolymers including or consisting of a low crosslinked polystyrene matrix on which polyethylene glycol (PEG or POE) is grafted. The PEG spacer is attached to the matrix via an ethyl ether group which increases stability towards acid treatment and minimizes PEG-leaching. These graft copolymers are pressure stable and can be used in batch processes as well as under continuous flow conditions. Typically, the PEG spacer is in the range of MW 3000 Da. HypoGel® is a hydrophilic gel type resin which combines high capacities with good solvent compatibility. Glycol spacers with n=5 or 10 EO units separate the reactive sites from the polystyrene matrix and modify the hydrophobic properties of the polystyrene backbone.

Advantageously, the cleavable tether may be an ester-type tether having a structure:

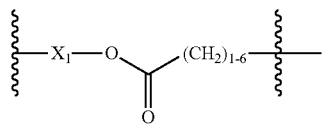

wherein $X_1$ represents any related art linkers of Wang-type resins. Cleavage of this type of tether leads to a uniform polyurethane having the structure:

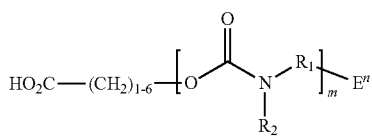

wherein m, $R_1$, $R_2$ and $E''$ are as defined above.

In a first coupling step (i), the OH groups present on the surface of the solid or soluble support are reacted with a carbonate compound

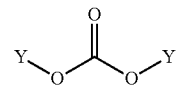

wherein each occurrence of Y is independently a succinimidyl or pyridyl moiety, to give a first dissymmetric active carbonate

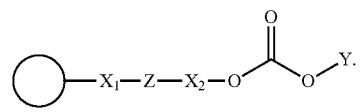

It was discovered that the reaction of dissymmetric active carbonates with primary and secondary amines is chemoselective and can be performed in the presence of unprotected alcohols. Thus, in step (ii) the adduct formed in step (i) is then reacted with an amino alcohol $R_2HN—R_1—OH$ to afford selectively a hydroxy-functional carbamate

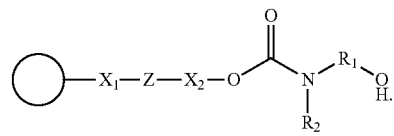

The iterative repetition of coupling steps (i) and (ii) allows protecting-group-free synthesis of uniform symmetric polyurethanes.

Advantageously, steps (i) and (ii) proceed in a high yield to ensure proper control of the polymer sequence. Advantageously or preferably steps (i) and (ii) proceed in >95%, advantageously or preferably >96%, advantageously or preferably >97%, advantageously or preferably >98%, advantageously or preferably >99% yield.

Advantageously, the carbonate compound

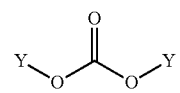

in each iteration of step (i) may be used in equimolar amount relative to the carbonate-reactive sites (OH groups) present on the solid or soluble support. As such, the carbonate compound

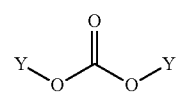

may be used in 1-10 molar excess, advantageously or preferably 1-8 molar excess, advantageously or preferably 1-6 molar excess, advantageously or preferably 1-5 molar excess, advantageously or preferably 1-3 molar excess, advantageously or preferably 1-2 molar excess, advantageously or preferably 1-1.5 molar excess, advantageously or preferably 1-1.3 molar excess, advantageously or preferably 1-1.2 molar excess, relative to the carbonate-reactive sites present on the solid or soluble support.

Advantageously, the use of a molar excess of the carbonate compound

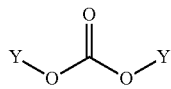

in each iteration of step (i) may help achieve the high yields, as defined above. Thus, advantageously, the carbonate compound

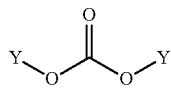

in each iteration of step (i) may be used in molar excess relative to the carbonate-reactive sites (OH groups) present on the solid or soluble support. For example, the carbonate group may be used in 1.5-10 molar excess, advantageously or preferably 2-10 molar excess, advantageously or preferably 2-8 molar excess, advantageously or preferably 2-6 molar excess relative to the carbonate-reactive sites present on the solid or soluble support.

Likewise, the amino alcohol $R_2HN-R_1-OH$ in each iteration of step (ii) may be used in equimolar amount or in molar excess relative to the amine-reactive sites present on the solid or soluble support

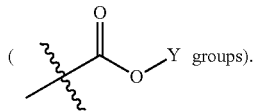

As such, the amino alcohol $R_2HN-R_1-OH$ may be used in 1-10 molar excess, advantageously or preferably 1-8 molar excess, advantageously or preferably 1-6 molar excess, advantageously or preferably 1-5 molar excess, advantageously or preferably 1-3 molar excess, advantageously or preferably 1-2 molar excess, advantageously or preferably 1-1.5 molar excess, advantageously or preferably 1-1.3 molar excess, advantageously or preferably 1-1.2 molar excess, relative to the amine-reactive sites present on the solid or soluble support.

Alternatively, the use of a molar excess of the amino alcohol $R_2HN-R_1-OH$ in each iteration of step (ii) may help achieve the desired high yield, as defined above. For example, the amino alcohol $R_2HN-R_1-OH$ may be used in 1.5-15 molar excess, advantageously or preferably 2-15 molar excess, advantageously or preferably 5-15 molar excess, advantageously or preferably 8-12 molar excess relative to the amine-reactive sites present on the solid or soluble support.

Advantageously, each iteration of step (i) and (ii) may be carried out in suitable conditions to optimize the coupling yield. For example, each iteration of step (i) may be carried out in acetonitrile, advantageously or preferably under microwave irradiation (50-70° C., advantageously or preferably 60° C., 8 W). Other solvents may be used for step (i), for example DMF, NMP, DMA.

Likewise, for example, each iteration of step (ii) may be carried out in N,N-dimethylformamide, advantageously or preferably in the presence of a base such as trimethylamine, triethylamine, or diisopropylethylamine. Other solvents may be used for step (ii), for example NMP, THF, Toluene, $CH_2Cl_2$, depending on the substituents and the solubility of the amino alcohol monomer $R_2HN-R_1-OH$ used in this step. Advantageously or preferably, each iteration step (ii) may be carried out at room temperature (20-25° C.). Advantageously or preferably, each iterations steps (i) and (ii) may be carried under inert atmosphere, such as dry nitrogen or argon gas.

Between each step, the adduct may be purified and separated by removing the solvent. This may be accomplished by carrying out steps (i) and (ii) in a solid-phase extraction tube. When the support is solid, the solvent may simply be drained after each reaction step; When the support is soluble, a suitable solvent may be added to precipitate the support, and then the solvent may be drained. For fluorous tags, a purification column can be used. After removal of the solvent of the reaction mixture, the remaining solid support may be rinsed with a suitable solvent before carrying out the next iteration step.

Advantageously, the carbonate compound

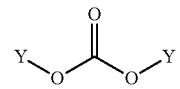

may be symmetric (the two occurrences of Y are identical). For example, the carbonate compound may be N,N'-disuccinimidyl carbonate (DSC) or di(2-pyridyl) carbonate:

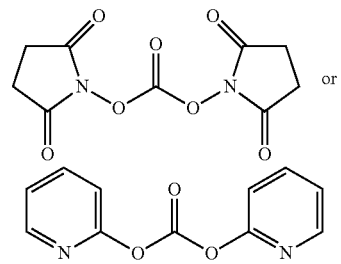

By using at least two different amino-alcohol compounds $R_2HN-R_1-OH$ to synthesize the uniform polyurethane according to some embodiments, coding of the polyurethane may be achieved.

Thus, advantageously, at least one $R_2NH-R_1-OH$ is different from those used in previous iterations. This allows to use the final sequence-defined polyurethane obtained by the process as binary coded information or binary coded message. If at least two $R_2NH-R_1-OH$ are different from those used in previous iterations, a ternary sequence coding may be accomplished. Likewise, quaternary, quinary, senary, septenary, octonary, nonary, denary and higher coding systems may be obtained if at least three, four, five, six, seven eight, nine, ten, eleven, or higher different $R_2NH-R_1-OH$ are used in step (ii) from those used in previous iterations.

The coding may be effected by using at least two amino-alcohol compounds $R_2HN-R_1-OH$ which differ in that they have different $R_1$ groups (for example $R1=$—$(CH_2)_3$— or —$(CH_2)_4$—), different $R_2$ groups (for example, $R_2=$H or methyl), or both.

For example, the coding (specific sequence definition) of the polyurethane may be achieved by synthesizing the uniform polyurethane using at least two amino-alcohol compounds $R_2HN$—$R_1$—OH that differ in the linker $R_1$. For example, the $R_1$ groups of the different $R_2HN$—$R_1$—OH monomers can be linear or branched aliphatic linkers having at least one $R_{1A}$ group, wherein at least two $R_2HN$—$R_1$—OH monomers used in the synthesis have different $R_{1A}$ groups. For example, the $R_{1A}$ substituent(s) in each $R_2HN$—$R_1$—OH monomer may be selected from H (when $R_1$ is not branched); linear, branched or cyclic $C_{1-6}$alkyl; linear, branched or cyclic $C_{1-8}$heteroalkyl; halogen atom; $C_{1-6}$alkyl-$C_{6-10}$aryl such as benzyl; a protected or non protected reactive side group such as azides, terminal alkynes, allyl groups; a fluorescent moiety or a positively or negatively charged moiety.

Advantageously, each occurrence of $R_1$ may independently be a $C_{1-20}$alkyl, $C_{1-20}$haloalkyl, $C_{1-20}$heteroalkyl, $C_{1-20}$heterohaloalkyl, $C_{1-20}$alkyl-$C_{6-10}$aryl-$C_{1-20}$alkyl, $C_{1-20}$alkyl-$C_{6-10}$aryl-$C_{1-20}$heteroalkyl, $C_{1-20}$heteroalkyl-$C_{6-10}$aryl-$C_{1-20}$alkyl, $C_{1-20}$heteroalkyl-$C_{6-10}$aryl-$C_{1-20}$heteroalkyl, $C_{1-20}$alkyl-$C_{3-10}$heteroaryl-$C_{1-20}$alkyl, $C_{1-20}$alkyl-$C_{3-10}$heteroaryl-$C_{1-20}$heteroalkyl, $C_{1-20}$heteroalkyl-$C_{3-10}$heteroaryl-$C_{1-20}$alkyl, or $C_{1-20}$heteroalkyl-$C_{3-10}$heteroaryl-$C_{1-20}$heteroalkyl moiety bearing at least one $R_{1A}$ as defined in any variant herein; wherein each of the foregoing alkyl and heteroalkyl moieties may be linear, branched, or cyclic. Advantageously, each occurrence of $R_1$ may independently be a $C_{1-10}$alkyl, $C_{1-10}$haloalkyl, $C_{1-10}$heteroalkyl, $C_{1-10}$ heterohaloalkyl, $C_{1-10}$alkyl-$C_{6-10}$aryl-$C_{1-10}$alkyl, $C_{1-10}$alkyl-$C_{6-10}$aryl-$C_{1-10}$heteroalkyl, $C_{1-10}$heteroalkyl-$C_{6-10}$aryl-$C_{1-10}$alkyl, $C_{1-10}$heteroalkyl-$C_{6-10}$aryl-$C_{1-10}$heteroalkyl, $C_{1-10}$alkyl-$C_{3-10}$heteroaryl-$C_{1-10}$alkyl, $C_{1-10}$alkyl-$C_{3-10}$heteroaryl-$C_{1-10}$heteroalkyl, $C_{1-10}$heteroalkyl-$C_{3-10}$heteroaryl-$C_{1-10}$alkyl, or $C_{1-10}$heteroalkyl-$C_{3-10}$heteroaryl-$C_{1-10}$heteroalkyl moiety bearing at least one $R_{1A}$ as defined in any variant above; wherein each of the foregoing alkyl and heteroalkyl moieties may be linear, branched, or cyclic. Advantageously, each occurrence of $R_1$ may independently be a $C_{1-6}$alkyl, $C_{1-6}$haloalkyl, $C_{1-6}$heteroalkyl, $C_{1-6}$heterohaloalkyl, $C_{1-6}$alkyl-$C_{6-10}$aryl-$C_{1-6}$alkyl, $C_{1-6}$alkyl-$C_{6-10}$aryl-$C_{1-6}$heteroalkyl, $C_{1-6}$heteroalkyl-$C_{6-10}$aryl-$C_{1-6}$alkyl, $C_{1-6}$ heteroalkyl-$C_{6-10}$aryl-$C_{1-6}$heteroalkyl, $C_{1-6}$alkyl-$C_{3-10}$heteroaryl-$C_{1-6}$alkyl, $C_{1-6}$alkyl-$C_{3-10}$heteroaryl-$C_{1-6}$heteroalkyl, $C_{1-6}$heteroalkyl-$C_{3-10}$heteroaryl-$C_{1-6}$alkyl, or $C_{1-6}$ heteroalkyl-$C_{3-10}$heteroaryl-$C_{1-6}$heteroalkyl moiety bearing at least one $R_{1A}$ as defined in any variant above; wherein each of the foregoing alkyl and heteroalkyl moieties may be linear, branched, or cyclic. Advantageously, each occurrence of $R_1$ may independently be a $C_{1-20}$alkyl, $C_{1-20}$haloalkyl, $C_{1-20}$heteroalkyl, $C_{1-20}$alkyl-$C_{6-10}$aryl-$C_{1-20}$alkyl, or $C_{1-20}$alkyl-$C_{3-10}$heteroaryl-$C_{1-20}$alkyl moiety bearing at least one $R_{1A}$ as defined in any variant above; wherein each of the foregoing alkyl and heteroalkyl moieties may be linear, branched, or cyclic. Advantageously, each occurrence of $R_1$ may independently be a $C_{1-10}$alkyl, $C_{1-10}$haloalkyl, $C_{1-10}$heteroalkyl, $C_{1-10}$heteroalkyl, $C_{1-10}$heterohaloalkyl, $C_{1-10}$alkyl-phenyl-$C_{1-10}$alkyl, $C_{1-10}$alkyl-phenyl-$C_{1-10}$heteroalkyl, $C_{1-10}$heteroalkyl-phenyl-$C_{1-10}$alkyl, or $C_{1-10}$heteroalkyl-phenyl-$C_{1-10}$heteroalkyl moiety bearing at least one $R_{1A}$ as defined in any variant herein; wherein each of the foregoing alkyl and heteroalkyl moieties may be linear, branched, or cyclic. Advantageously, each occurrence of $R_1$ may independently be a $C_{1-6}$alkyl, $C_{1-6}$haloalkyl, $C_{1-6}$heteroalkyl, $C_{1-6}$heterohaloalkyl, $C_{1-6}$alkyl-phenyl-$C_{1-6}$alkyl, $C_{1-6}$alkyl-phenyl-$C_{1-6}$heteroalkyl, $C_{1-6}$heteroalkyl-phenyl-$C_{1-6}$alkyl, or $C_{1-6}$heteroalkyl-phenyl-$C_{1-6}$heteroalkyl moiety bearing at least one $R_{1A}$ as defined in any variant herein; wherein each of the foregoing alkyl and heteroalkyl moieties may be linear, branched, or cyclic. Advantageously, each occurrence of $R_1$ may independently be a $C_{1-6}$alkyl, or $C_{1-6}$haloalkyl moiety bearing at least one $R_{1A}$ as defined in any variant herein; wherein each of the foregoin alkyl moieties may be linear, branched, or cyclic. Advantageously, each occurrence of $R_1$ may independently be a linear, branched, or cyclic $C_{1-6}$alkyl moiety bearing at least one $R_{1A}$ as defined in any variant herein. In the above embodiments, each occurrence of $R_{1A}$ may be independently H, linear, branched or cyclic $C_{1-6}$alkyl, linear, branched or cyclic $C_{1-8}$heteroalkyl; halogen atom; $C_{1-6}$alkyl-phenyl such as benzyl; a fluorescent moiety or a positively or negatively charged moiety.

When $R_{1A}$ represents a fluorescent moiety, it may be selected from moieties including a protected or non protected fluorophore such as Fluorescein, Rhodamine, Coumarin, Pyrene, BODIPY derivatives, or a Dansyl group, wherein the fluorophore moiety may be bound to $R_1$ either directly or via a suitable linker selected from a $C_{1-20}$ aliphatic, $C_{1-20}$heteroaliphatic, $C_{0-20}$(hetero)aliphatic-$C_{6-10}$aryl-$C_{0-20}$(hetero)aliphatic, or $C_{0-20}$(hetero)aliphatic-$C_{3-10}$heteroaryl-$C_{0-20}$(hetero)aliphatic moiety wherein each of the foregoing aliphatic or heteroaliphatic moieties may be linear or branched and saturated or unsaturated. Advantageously, each occurrence of $R_1$ may independently be a $C_{1-10}$alkyl, $C_{1-10}$haloalkyl, $C_{1-10}$heteroalkyl, $C_{1-10}$ heterohaloalkyl, $C_{1-10}$alkyl-phenyl-$C_{1-10}$alkyl, $C_{1-10}$alkyl-phenyl-$C_{1-10}$heteroalkyl, $C_{1-10}$heteroalkyl-phenyl-$C_{1-10}$alkyl, or $C_{1-10}$heteroalkyl-phenyl-$C_{1-10}$heteroalkyl moiety; bearing at least one $R_{1A}$ as defined in any variant herein. Advantageously, each occurrence of $R_1$ may independently be a $C_{1-6}$alkyl, $C_{1-6}$haloalkyl, $C_{1-6}$heteroalkyl, $C_{1-6}$heterohaloalkyl, $C_{1-6}$alkyl-phenyl-$C_{1-6}$alkyl, $C_{1-6}$alkyl-phenyl-$C_{1-6}$heteroalkyl, $C_{1-6}$heteroalkyl-phenyl-$C_{1-6}$alkyl, or $C_{1-6}$heteroalkyl-phenyl-$C_{1-6}$heteroalkyl moiety; bearing at least one $R_{1A}$ as defined in any variant herein.

When $R_{1A}$ represents a positively or negatively charged moiety, it may be selected from moieties including a protected or non protected ionic group such as carboxylic acids, sulfates, phosphates, quaternized amines, wherein the ionic group may be bound to $R_1$ either directly or via a suitable linker selected from a $C_{1-20}$ aliphatic, $C_{1-20}$heteroaliphatic, $C_{0-20}$(hetero)aliphatic-$C_{6-10}$aryl-$C_{0-20}$(hetero)aliphatic, or $C_{0-20}$(hetero)aliphatic-$C_{3-10}$heteroaryl-$C_{0-20}$(hetero)aliphatic moiety wherein each of the foregoing aliphatic or heteroaliphatic moieties may be linear or branched and saturated or unsaturated. Advantageously, each occurrence of $R_{1A}$ may be independently H, methyl, ethyl, n-propyl, i-propyl, n-butyl, sec-butyl, cyclopentyl, cyclohexyl, benzyl, —$(CH_2)_{1-3}O(CH_2)_{1-3}$—, —$(CH_2)_{1-3}S(CH_2)_{1-3}$—, —$O(CH_2CH_2O)_{1-3}CH_3$, —$(CH_2)_{1-3}O(CH_2)_{0-2}CH_3$, or —$(CH_2)_{1-3}S(CH_2)_{0-2}CH_3$; advantageously or preferably H, methyl, ethyl, n-propyl, i-propyl, n-butyl, or sec-butyl; more advantageously or preferably H, methyl or ethyl; most advantageously or preferably H or methyl.

Advantageously, in the $R_2NH$—$R_1$—OH compounds used in the different iterations of step (ii), at least one $R_1$ may be different from those used in previous iterations. This allows to use the final sequence-defined polyurethane obtained by the process as binary coded information or binary coded message. If at least two $R_1$ are different from those used in previous iterations, a ternary sequence coding may be accomplished. Likewise, quaternary, quaternary, quinary, senary, septenary, octonary, nonary, denary and higher coding systems may be obtained if at least three, four, five, six, seven eight, nine, ten, eleven, or higher different $R_1$ are used in step (ii) from the $R_2NH-R_1-OH$ compounds used in previous iterations.

Advantageously, in the $R_2NH-R_1-OH$ compounds used in the different iterations of step (ii), each occurrence of $R_1$ may independently represent a linear or branched alkyl having the structure:

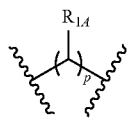

wherein p is an integer from 1-20; and at least one occurrence of $R_{1A}$ represents H or linear, branched or cyclic $C_{1-6}$alkyl, benzyl, $-(CH_2)_{1-3}O(CH_2)_{1-3}-$, $-(CH_2)_{1-3}S(CH_2)_{1-3}-$, $-O(CH_2CH_2O)_{1-3}CH_3$, $-(CH_2)_{1-3}O(CH_2)_{0-2}CH_3$, or $-(CH_2)_{1-3}S(CH_2)_{0-2}CH_3$; advantageously or preferably linear $C_{1-6}$alkyl; advantageously or preferably methyl, ethyl, n-propyl, i-propyl, n-butyl, or sec-butyl; more advantageously or preferably methyl or ethyl; most advantageously or preferably methyl. Advantageously, at least one occurrence of $R_{1A}$ represents linear, branched or cyclic $C_{1-6}$alkyl, benzyl, $-(CH_2)_{1-3}O(CH_2)_{1-3}-$, $-(CH_2)_{1-3}S(CH_2)_{1-3}-$, $-O(CH_2CH_2O)_{1-3}CH_3$, $-(CH_2)_{1-3}O(CH_2)_{0-2}CH_3$, or $-(CH_2)_{1-3}S(CH_2)_{0-2}CH_3$; advantageously or preferably linear $C_{1-6}$alkyl; advantageously or preferably methyl, ethyl, n-propyl, i-propyl, n-butyl, or sec-butyl; more advantageously or preferably methyl or ethyl; most advantageously or preferably methyl; and the other occurrences of $R_{1A}$ may be H. Advantageously, p may be an integer from 2-6. Advantageously, in the structure

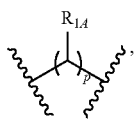

all but one occurrence of $R_{1A}$ may be H.

Advantageously, two different types of $H_2N-R_1-OH$, differing by the nature of $R_1$ group, may be used over the sequence of iterations of step (ii). The $R_1$ groups may differ by their chain length, the nature of the $R_{1A}$ lateral chain, or both. Advantageously, the $R_1$ groups may differ by the nature or number of the $R_{1A}$ lateral chain(s). For example, the following couples of $H_2N-R_1-OH$ may be used to build the uniform sequence-defined polyurethane:

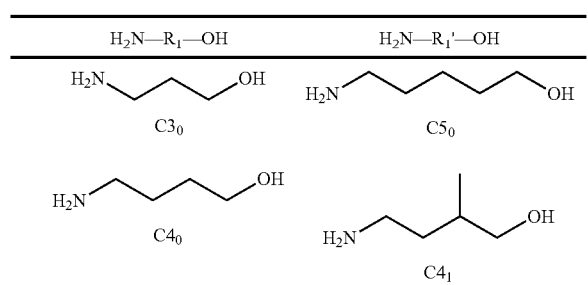

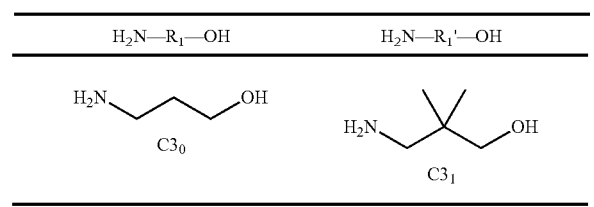

Alternatively or additionally, The $R_1$ groups may differ by the nature of the chain between the amino and hydroxyl groups: alkyl chain, heteroalkyl chain, arakyl chain, etc. For example, at least two different types of $H_2N-R_1-OH$ may be used over the sequence of iterations of step (ii), selected from the following monomers:

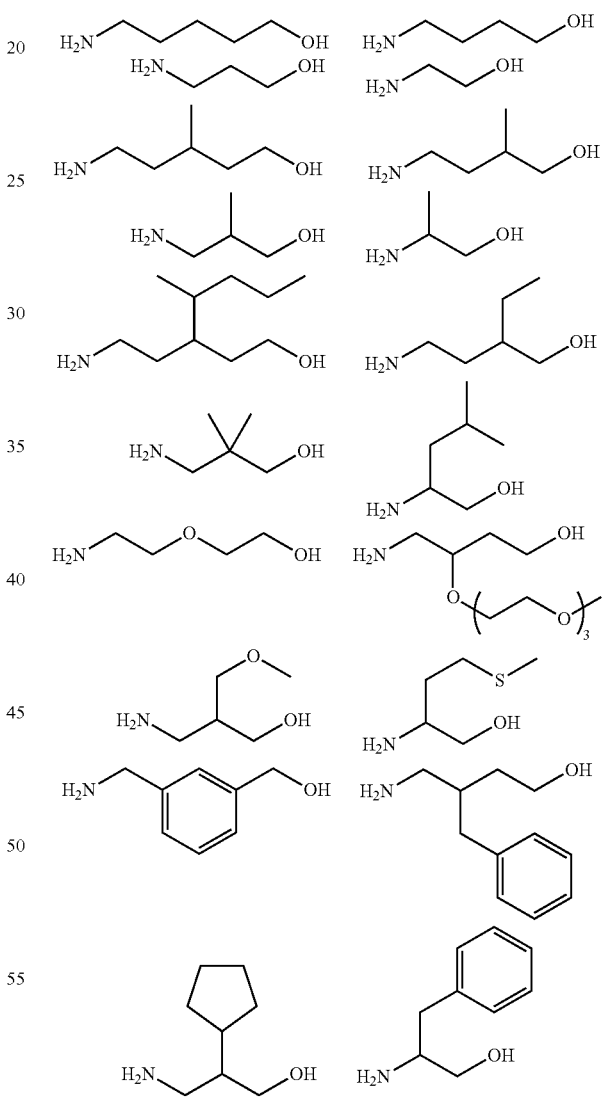

Advantageously, in each iteration of step (ii) $R_2$ may be independently H or a $C_{1-20}$alkyl, $C_{1-20}$haloalkyl, $C_{1-20}$heteroalkyl, $C_{1-20}$heterohaloalkyl, $C_{1-20}$alkyl-$C_{6-10}$aryl-$C_{1-20}$alkyl, $C_{1-20}$alkyl-$C_{6-10}$aryl-$C_{1-20}$heteroalkyl, $C_{1-20}$heteroalkyl-$C_{6-10}$aryl-$C_{1-20}$alkyl, $C_{1-20}$heteroalkyl-$C_{6-10}$aryl-$C_{1-20}$heteroalkyl, $C_{1-20}$alkyl-$C_{3-10}$heteroaryl-$C_{1-20}$alkyl, $C_{1-20}$alkyl-$C_{3-10}$heteroaryl-$C_{1-20}$heteroalkyl, $C_{1-20}$heteroalkyl-$C_{3-10}$heteroaryl-$C_{1-20}$alkyl, or $C_{1-20}$heteroalkyl-$C_{3-10}$heteroaryl-$C_{1-20}$heteroalkyl moiety; wherein each of the foregoing alkyl and heteroalkyl moieties may be linear, branched, or cyclic. Advantageously, in each iteration of step (ii) $R_2$ may be may independently be H or a $C_{1-10}$alkyl, $C_{1-10}$haloalkyl, $C_{1-10}$heteroalkyl, $C_{1-10}$heterohaloalkyl, $C_{1-10}$alkyl-$C_{6-10}$aryl-$C_{1-10}$alkyl, $C_{1-10}$alkyl-$C_{6-10}$aryl-$C_{1-10}$heteroalkyl, $C_{1-10}$heteroalkyl-$C_{6-10}$aryl-$C_{1-10}$alkyl, $C_{1-10}$heteroalkyl-$C_{6-10}$aryl-$C_{1-10}$heteroalkyl, $C_{1-10}$alkyl-$C_{3-10}$heteroaryl-$C_{1-10}$alkyl, $C_{1-10}$alkyl-$C_{3-10}$heteroaryl-$C_{1-10}$heteroalkyl, $C_{1-10}$heteroalkyl-$C_{3-10}$heteroaryl-$C_{1-10}$alkyl, or $C_{1-10}$heteroalkyl-$C_{3-10}$heteroaryl-$C_{1-10}$heteroalkyl moiety; wherein each of the foregoing alkyl and heteroalkyl moieties may be linear, branched, or cyclic. Advantageously, in each iteration of step (ii) $R_2$ may be may independently be H or a $C_{1-6}$alkyl, $C_{1-6}$haloalkyl, $C_{1-6}$heteroalkyl, $C_{1-6}$heterohaloalkyl, $C_{1-6}$alkyl-$C_{6-10}$aryl-$C_{1-6}$alkyl, $C_{1-6}$alkyl-$C_{6-10}$aryl-$C_{1-6}$heteroalkyl, $C_{1-6}$heteroalkyl-$C_{6-10}$aryl-$C_{1-6}$alkyl, $C_{1-6}$ heteroalkyl-$C_{6-10}$aryl-$C_{1-6}$heteroalkyl, $C_{1-6}$alkyl-$C_{3-10}$heteroaryl-$C_{1-6}$alkyl, $C_{1-6}$alkyl-$C_{3-10}$heteroaryl-$C_{1-6}$heteroalkyl, $C_{1-6}$heteroalkyl-$C_{3-10}$heteroaryl-$C_{1-6}$alkyl, or $C_{1-6}$ heteroalkyl-$C_{3-10}$heteroaryl-$C_{1-6}$heteroalkyl moiety; wherein each of the foregoing alkyl and heteroalkyl moieties may be linear, branched, or cyclic. Advantageously, in each iteration of step (ii) $R_2$ may be independently H or a $C_{1-20}$alkyl, $C_{1-20}$haloalkyl, $C_{1-20}$alkyl-$C_{6-10}$aryl-$C_{1-20}$alkyl, or $C_{1-20}$alkyl-$C_{3-10}$heteroaryl-$C_{1-20}$alkyl moiety; wherein each of the foregoing alkyl and heteroalkyl moieties may be linear, branched, or cyclic. Advantageously, in each iteration of step (ii) $R_2$ may be independently H or a $C_{1-6}$alkyl, $C_{1-6}$haloalkyl, $C_{1-6}$heteroalkyl, $C_{1-6}$heterohaloalkyl, $C_{1-6}$alkyl-phenyl-$C_{1-6}$ alkyl, $C_{1-6}$alkyl-phenyl-$C_{1-6}$heteroalkyl, $C_{1-6}$heteroalkyl-phenyl-$C_{1-6}$alkyl, or $C_{1-6}$heteroalkyl-phenyl-$C_{1-6}$heteroalkyl moiety; wherein each of the foregoing alkyl and heteroalkyl moieties may be linear, branched, or cyclic. Advantageously, in each iteration of step (ii) $R_2$ may be independently H or a $C_{1-6}$alkyl, or $C_{1-6}$haloalkyl moiety; wherein each of the foregoing alkyl and heteroalkyl moieties may be linear, branched, or cyclic. Advantageously, in each iteration of step (ii) $R_2$ may be independently H or a linear, branched, or cyclic $C_{1-6}$alkyl moiety. Advantageously, in each iteration of step (ii) $R_2$ may be independently H or methyl, ethyl, n-propyl, i-propyl, n-butyl, or sec-butyl; advantageously or preferably H, methyl or ethyl; advantageously or preferably H or methyl; most advantageously or preferably H.

Advantageously, the chain length, m, of the final polyurethane may be an integer between 4 and 500, advantageously or preferably between 4 and 250, advantageously or preferably between 4 and 100, advantageously or preferably between 10 and 50, advantageously or preferably between 20 and 25. The chain length may be longer, allowing for more complex encoding. For example, the chain length, m, of the final polyurethane may be an integer between 50 and 200, advantageously or preferably between 100 and 200, advantageously or preferably between 150 and 200, advantageously or preferably between 50 and 100.

Advantageously, E may be a terminal group selected from a $C_{1-20}$ aliphatic, $C_{1-20}$heteroaliphatic, $C_{6-10}$aryl, $C_{1-20}$ aliphatic-$C_{6-10}$aryl, $C_{1-20}$heteroaliphatic-$C_{6-10}$aryl, $C_{3-10}$heteroaryl, $C_{1-20}$ aliphatic-$C_{3-10}$heteroaryl, or $C_{1-20}$heteroaliphatic-$C_{3-10}$heteroaryl moiety, or a moiety that is or includes a solid or soluble support. Specifically, E may be a terminal group selected from $C_{1-20}$heteroaliphatic or a moiety having the structure

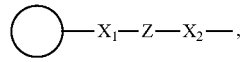

wherein Z, $X_1$ and $X_2$ are as defined in any variant above. Advantageously, E may represent a carboxylated alkyl chain $HOC(=O)-(CH_2)_{1-6}-$, for example $HOC(=O)-(CH_2)_5-$.

When E represents a moiety having the structure

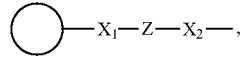

the solid or soluble support can then be cleaved using acidic or basic conditions, red-ox cleavage, photocleavage or thermal cleavage, depending on the nature of the responsively cleavable group Z, once the desired chain length has been obtained. As detailed above, the nature of E will depend on the cleavable tether present on the solid or soluble support used to carry out the method. Advantageously or preferably, the solid support may be a Wang-type hydroxylated polystyrene resin, in the tether $-X_1-Z-X_2-$ Z may represent a labile carboxylic ester bond wherein $X_1$ and $X_2$ are bound to Z via a carbon atom other than $C=O$ or $C=S$, which carboxylic ester bond may be cleaved by acidic treatment with trifluoroacetic acid (TFA), and E may be $HOC(=O)-X_2-$, wherein $X_2$ is as defined in any variant above and may represent for example a branched or linear $C_{1-6}$alkyl chain such as $(CH_2)_5-$, provided that $X_2$ is bound to the $-CO_2H$ moiety via a carbon atom.

Advantageously, E" may be a terminal group selected from OH, a $C_{1-20}$alkyl, $C_{1-20}$haloalkyl, $C_{1-20}$heteroalkyl, $C_{1-20}$heterohaloalkyl, $C_{6-10}$aryl, $C_{1-20}$alkyl-$C_{6-10}$aryl, $C_{1-20}$heteroalkyl-$C_{6-10}$aryl, $C_{3-10}$heteroaryl, $C_{1-20}$alkyl-$C_{3-10}$heteroaryl, or $C_{1-20}$heteroalkyl-$C_{3-10}$heteroaryl moiety. The nature of E" will depend on the termination reaction carried out at the end of the iterative method. Advantageously or preferably, E" may be OH.

Advantageously, E may represent $HOC(=O)-X_2-$, wherein $X_2$ is as defined in any variant above and may represent for example a branched or linear $C_{1-6}$alkyl chain such as $(CH_2)_5-$, and E" may be OH; provided that $X_2$ is bound to the $-CO_2H$ moiety via a carbon atom.

In another embodiment, there is provided a uniform sequence-defined polyurethane obtainable by a method according to some embodiments, as detailed in any one or more of the embodiments and variants of the method presented above.

The polyurethane of some embodiments may have a formula:

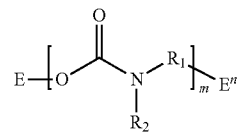

wherein
E is a terminal group selected from H, a $C_{1-20}$ aliphatic, $C_{1-20}$heteroaliphatic, $C_{6-10}$aryl, $C_{1-20}$ aliphatic-$C_{6-10}$aryl, $C_{1-20}$heteroaliphatic-$C_{6-10}$aryl, $C_{3-10}$heteroaryl, $C_{1-20}$ aliphatic-$C_{3-10}$heteroaryl, or $C_{1-20}$heteroaliphatic-$C_{3-10}$heteroaryl moiety, or a moiety that is or includes a suitable support for stepwise immobilized-polymer synthesis;

E″ is a terminal group selected from OH, a $C_{1-20}$ aliphatic, $C_{1-20}$heteroaliphatic, $C_{6-10}$aryl, $C_{1-20}$ aliphatic-$C_{6-10}$aryl, $C_{1-20}$heteroaliphatic-$C_{6-10}$aryl, $C_{3-10}$heteroaryl, $C_{1-20}$ aliphatic-$C_{3-10}$heteroaryl, or $C_{1-20}$heteroaliphatic-$C_{3-10}$heteroaryl moiety; each occurrence of $R_1$ is independently a $C_{1-20}$ aliphatic, $C_{1-20}$heteroaliphatic, $C_{1-20}$(hetero)aliphatic-$C_{6-10}$aryl-$C_{1-20}$-(hetero)aliphatic, or $C_{1-20}$(hetero)aliphatic-$C_{3-10}$-heteroaryl-$C_{1-20}$-(hetero)aliphatic moiety; advantageously or preferably bearing at least one $R_{1A}$ substituent selected from H, $C_{1-6}$alkyl, halogen atom, a protected or non protected reactive side group such as azides, terminal alkynes, allyl groups, a fluorescent moiety or a positively or negatively charged moiety; wherein each of the foregoing aliphatic or heteroaliphatic moieties may be linear, branched or cyclic and saturated or unsaturated;

each occurrence of $R_2$ is independently H or a $C_{1-20}$ aliphatic, $C_{1-20}$heteroaliphatic, $C_{1-20}$-(hetero)aliphatic-$C_{6-10}$aryl-$C_{1-20}$-(hetero)aliphatic, or $C_{1-20}$(hetero)aliphatic-$C_{3-10}$-heteroaryl-$C_{1-20}$-(hetero)aliphatic moiety; wherein each of the foregoing aliphatic or heteroaliphatic moieties may be linear, branched or cyclic and saturated or unsaturated;

m is an integer from 2 to 1000;

wherein the polyurethane is uniform and sequence-defined.

Advantageously, E may have the structure:

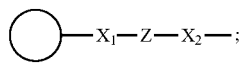

wherein

represents a suitable support for stepwise immobilized-polymer synthesis; and $X_1$, Z and $X_2$ are as defined above and herein in any variant.

All the variants and embodiments detailed above for the method of the presently disclosed subject matter, with respect to variables Y, carbonate compound, $X_1$, $X_2$, Z, cleavable tether, solid or soluble solid, $R_1$, $R_2$, $R_{1A}$, m, p, E and E, are applicable mutatis mutandis to the definition of the polyurethane of some embodiments, and will not be repeated here for the sake of conciseness.

Advantageously, in the polyurethane, at least two occurrences of $R_1$ are different and each occurrence of $R_2$ is H.

Advantageously, polyurethane structures including at least three monomer units are made. In such embodiments, the polyurethane is of a certain defined length, and has a defined, predetermined sequence of structurally different monomer units, where the sequence of monomer units arises from a predetermined plan, rather than as a result of a random copolymerization reaction.

Different types of predetermined sequences of monomers are contemplated by some embodiments. Advantageously, a predetermined sequence may be free of, or have no repeating patterns that exist consistently throughout the entire polymer. Solely by way of example, a hexamer of the sequence ABCADAC or ABCDEF is an example of a predetermined sequence without a repeating pattern, wherein A, B, C, D, E, and F represent monomer units disclosed herein.

Advantageously, the predetermined sequence of monomers may have monomers that are present in repeating patterns, such as (AB)n, or (ABC)n, or (ABCBA)n, but that are uniform, or substantially uniform. The repeating patterns (AB)n, or (ABC)n, or (ABCBA)n are solely presented as examples and are not intended to be limiting. Predetermined sequences with repeating patterns can be made using the method disclosed herein, and advantageously the method according to some embodiments can be used to produce polyurethanes having a defined length, thereby producing a uniform or substantially uniform polyurethane. Such sequence-defined polyurethanes are distinguished from those produced using related art methods of making, such as step-growth polymerizations. These related art methods can be used to produce polyurethanes having repeating patterns; however, polyurethanes produced using such methods do not have a defined length, and thereby are polydisperse.

Advantageously, the predetermined sequence of monomers can include monomers in blocks, such as (A)n(B)n, or (A)n(B)n(A)n, or (A)n(B)n(C)n, which are solely presented as exemplary patterns and are not intended to limit some embodiments. Such embodiments are referred to herein as block copolymers. These block copolymers have a defined length and therefore are uniform or substantially uniform. These sequence-defined block copolyurethanes are distinguished from those in the art that are produced from successive step-growth polymerizations, as polymers produced from step-growth polymerizations do not produce block copolymers having a defined length, and thereby are polydisperse.

The structurally different monomer units of any of the above-mentioned polyurethanes may be different, or "defined," as a result of having different pendant side chains $R_{1A}$, different linker sections $R_1$, or a combination thereof. Advantageously, the pendant side chain $R_{1A}$ may simply be a hydrogen atom or a methyl group.

Advantageously, polyurethanes having a certain defined length, and a defined sequence of identical monomer units are disclosed. Such polyurethanes are referred to herein as homopolyurethanes. The homopolyurethanes disclosed herein are uniform or substantially uniform in contrast to polydisperse homopolyurethanes produced from related art step-growth batch polymerization reactions.

Advantageously, the monodispersity of the polyurethanes arises from the specific number of monomer units created in the course of starting and extending the polymer chain. Advantageously, the degree of polymerization and/or monodispersity obtained from using the above-disclosed methods can be determined based on the weight of the individual monomer components. For example, in embodiments where a homopolymer is made, the molecular weight of each individual monomer component can be determined and the degree of polymerization can be determined (or the length of the polymer can be confirmed) by dividing the number-average molecular weight or the molecular weight of the polymer by the molecular weight of the monomer component. Advantageously, the length of the polymer can be confirmed using an analytical technique, such as mass spectrometry, chromatography (e.g., HPLC or gel-permeation chromatography), nuclear magnetic resonance (NMR) spectrometry, dynamic light scattering, or the like.

Advantages of some embodiments include:
The uniform sequence-coded PUs of some embodiments can be prepared using a very simple chemoselective multistep-growth process, without the use or protection/deprotection steps The yields of the coupling steps (i) and (ii) are nearly quantitative allowing an optimal control of the sequence building of the uniform polyurethane Using monomers with different side chains ($R_{1A}$), information may be stored at the molecular level in the form of a coded monomer sequence and can be recovered using a sequencing technique The method allows access to uniform sequence-defined commodity polymers such as polyurethanes.

The method can be automated in the same manner as solid-phase peptide synthesis.

Hence, there is provided the use of classical plastics such as PUs for information storage.

Advantageously, the sequence of the uniform polyurethane may be determined by electrospray tandem mass spectrometry (ESI-MS/MS).

It was surprisingly discovered that the polyurethane of some embodiments are remarkably easy to sequence by negative mode tandem mass spectrometry (MS/MS). Accordingly, advantageously or preferably the sequence of the uniform polyurethane may be determined by negative mode electrospray ionization MS/MS tandem spectrometry.

All these advantages make this new class of coded plastics potentially interesting for applications in anti-counterfeiting technologies.

Counterfeiting of items such as goods, materials, and documents defrauds consumers, tarnishes the brand names of legitimate manufacturers and providers of such items, and can endanger public health (for example, when adulterated foods and drugs are passed off as genuine). Counterfeiting is a hugely lucrative business, with criminals relying on the continued high demand for cheap goods coupled with low production and distribution costs.

Anti-counterfeiting measures have included serial numbers, machine readable identifiers (e.g., scannable barcodes and two-dimensional codes), "tamper-proof" security labels (e.g., holograms and labels that change state or partly or completely self-destruct on removal), and remotely detectable tags (e.g., radio-frequency identification tags) applied to items directly or to tags, labels, and/or packaging for such items. However, such measures have themselves been counterfeited. Further, in light of such counterfeiting, consumers generally have been unable to rely upon such measures in order to verify the authenticity of marked or tagged items.

Applying invisible covert marks and indicia to products, product packaging, documents and printed materials is a well established method for authenticating products and thus combating counterfeiting. In addition, when variable invisible information is printed, batch-level and item-level tracking of products can be accomplished in a covert manner. Common covert marking materials are ultraviolet (UV) fluorescent inks. The security information is invisible under normal, visible lighting but is revealed when a UV light source is used, such as a UV flashlight. The product or document of interest is authenticated by revealing the invisible indicia with the UV flashlight and visually verifying the image or human-readable text or code that is revealed. While this can be an effective security feature, the authentication process has limitations.

Once a monodisperse sequence-defined polyurethane is created it can be used for numerous unique security applications including to detect illicit tampering with physical objects. For example, the coded polyurethane may be used to prevent counterfeiting by incorporating it into items during or after production and decrypting the coded information stored within the polyurethane structure (defined sequence controlled by the iterative method of some embodiments) to authenticate the items. For example, the sequence-defined polyurethane may be directly blended in an organic or inorganic matrix. Any suitable known methods may be used for that purpose, for example film casting, mechanical blending, hot-melt extrusion, spray deposition or in situ polymerization. Accordingly, sequence-defined PU plastics according to some embodiments could be an interesting alternative to DNA, which is primarily investigated nowadays in such applications.

Accordingly, in another aspect, some embodiments relate to anti-counterfeiting systems and methods, and more particularly to a system and method for uniquely identifying items so as to be able to distinguish genuine items from counterfeit versions. Specifically, some embodiments relate to the use of a polyurethane for information storage or as an anti-counterfeiting device.

During investigations, it is often the case that many items need to be authenticated sequentially, and the results of the authentication audit transmitted to another location. It is therefore useful to be able to automate the method for recording and storing the results and to have a convenient device for transmitting the results once collected. The uniform sequence-defined polyurethanes of some embodiments are perfectly adapted for such use since they can readily be decrypted using tandem mass spectrometry MS/MS, which can be automated for process large numbers of samples sequentially.

In addition, it is known that fluorescent materials, and other tags like magnetic or thermal tags can be used to create invisible indicia. As detailed above, fluorescent tags may be incorporated into the structure of the polyurethanes of some embodiments via the side chain $R_{1A}$, which may include a fluorescent group. Therefore, the possibility to combine the decryption of the sequence-defined polyuretheane structure, and the detection of the fluorescent tag, makes the polyurethanes of some embodiments all the more useful in anti-counterfeiting technology.

EQUIVALENTS

The representative examples that follow are intended to help illustrate some embodiments, and are not intended to, nor should they be construed to, limit the scope of some embodiments. Indeed, various modifications of some embodiments and many further embodiments thereof, in addition to those shown and described herein, will become apparent to those of ordinary skill in the art from the full contents of this document, including the examples which follow and the references to the scientific and patent literature cited herein. It should further be appreciated that the contents of those cited references are incorporated herein by reference to help illustrate the state of the art.

The following examples contain important additional information, exemplification and guidance that can be adapted to the practice of the presently disclosed subject matter in its various embodiments and the equivalents thereof.

EXEMPLIFICATION

The polyurethanes of some embodiments and their preparation can be understood further by the examples that illustrate some of the processes by which these polyurethanes are prepared or used. It will be appreciated, however, that these examples do not limit some embodiments. Variations of some embodiments, now known or further developed, are considered to fall within the scope of some embodiments as described herein and as hereinafter claimed.

Example 1. Preparation of Wang-Type Hydroxyl Functional Solid Support 4-benzyloxybenzyl alcohol polystyrene (Wang resin 100-200 mesh, Iris Biotech, 0.94 mmol/g resin, 300 mg, 0.94 mmol·g$^{-1}$, 0.28 mmol, 1 eq.) was placed into a solid phase extraction (SPE) tube and swollen in dichloromethane (DCM) for 5 min. A solution of 4-(dimethylamino)pyridine ("DMAP", 53 mg, 0.43 mmol, 1.5 eq.), N,N'-dicyclohexyl-carbodiimide (175 mg, 0.85 mmol, 3 eq.) and 6-(bis(4-methoxyphenyl)(phenyl)methoxy)hexanoic acid (360 mg, 0.83 mmol, 3 eq.) in DCM was then added at r.t. to the resin and the solution was shaken at r.t. for 36 h. 6-(bis(4-methoxyphenyl)(phenyl)methoxy)hexanoic acid can be obtained by DMT-protection of ethyl 6-hydroxyhexanoate, followed by saponification (DMT=4,4-dimethoxytrityl chloride). The resin was washed with N,N-dimethylformamide (10×) and then with DCM (2×) before proceeding to the next step. A solution of acetic anhydride in dry pyridine (1/5, 6 ml) was added to the SPE tube containing the modified resin and the solution was shaken for 2 h at r.t. The resin was washed five times with DCM before proceeding to the next step. A solution of trichloroacetic acid in DCM (3/97, w/w, 5 mL) was added to the SPE tube containing the modified resin and the solution was shaken for 30 min at r.t. The resin was washed five times with DCM. This step was repeated 2 times. The resin was then washed one time with diethyl ether.

Example 2. General Procedure for the Stepwise Synthesis of Polyurethanes

General Procedure for Coupling Step (i):

Di(N-succinimidyl) carbonate (6 molar Eq.) is first solubilized in dry acetonitrile by gentle heating. Afterwards, triethylamine (12 molar Eq.) is added to the solution. The mixture is then added in a microwave suitable glass tube containing a hydroxy-functional solid support (1 molar Eq. of hydroxy functions) and the tube is closed under argon flow. The reaction is then stirred for 1 h in a laboratory microwave for chemical synthesis (60° C., 8 W). After performing the reaction, the support is transferred into a solid-phase extraction tube and washed several times with N,N-dimethylformamide before proceeding step (ii).

General Procedure for Coupling Step (ii):

A solution of triethylamine (20 molar Eq.) and an amino-alcohol (10 molar Eq.) in dry N,N-dimethylformamide is added to a solid-phase extraction tube containing a solid support activated by di(N-succinimidyl) carbonate as described in step (i). The tube is then closed under argon flow and the reaction is shaken for 20 min at room temperature. After performing the reaction, the support is washed several times with dimethylformamide, diethyl ether, and eventually transferred back to a microwave tube to perform a further step (i).

Iterative Repetition of Coupling Steps (i) and (ii):

Steps (i) and (ii) are performed consecutively and repeated a certain number of times in order to reach a desired polyurethane chain-length. At each step (ii), the molecular structure of the amino-alcohol building block can be varied in order to synthesize polymers with controlled sequences of information.

Cleavage Procedure (v).

The cleavage procedure depends on the type of support and linker that are used for the synthesis. The following lines are written for a solid support containing a labile Wang-type ester linkage. Once a polymer with a desired chain-length is obtained, the solid-support is transferred into a vial. The cleavage is performed by adding a mixture of trifluoroacetic acid and anhydrous dichloromethane (5/5, v/v) to the resin. The cleavage reaction is conducted for 2 hours. Afterwards, the support is filtered-off and the filtrate is collected. Trifluoroacetic acid and dichloromethane are evaporated under reduced pressure to obtain the desired polyurethane as a white solid.

Example of a Polyurethane Obtained with this Methodology.

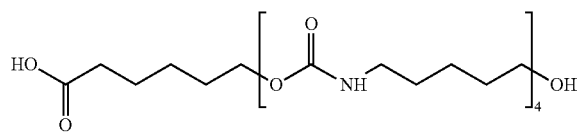

A polyurethane was prepared using 5-amino-1-pentanol as an amino alcohol in coupling step (ii). For the synthesis of this polymer, coupling steps (i) and (ii) were successively repeated four times. Afterwards, the polymer was cleaved from the support following procedure (iii). The obtained polyurethane is a white solid (55 mg). The yield was 90%.

Other exemplary polyurethanes prepared according to some embodiments are listed in Table 1 below:

TABLE 1

| | Alphabet | Sequence[a] | m/z$_{th}$[b] | m/z$_{exp}$[b] | Yield (%) |
|---|---|---|---|---|---|
| P1 | C5$_0$ | E-0-0-0-0-OH | 647.3873 | 647.3876 | 90 |
| P2 | C4$_0$/C4$_1$ | E-1-0-0-0-1-OH | 734.4193 | 734.4191 | 87 |
| P3 | C4$_0$/C4$_1$ | E-0-0-0-1-1-1-OH | 863.4983 | 863.4985 | ~100 |
| P4 | C4$_0$/C4$_1$ | E-1-0-1-0-1-0-OH | 863.4983 | 863.4976 | ~100 |
| P5 | C4$_0$/C4$_1$ | E-0-0-0-1-0-1-OH | 849.4826 | 849.4796 | ~100 |
| P6 | C4$_0$/C4$_1$ | E-0-0-1-1-1-1-0-OH | 1121.6562 | 1121.6549 | 78 |
| P7 | C3$_0$/C3$_1$ | E-0-0-1-0-OH | 563.2934 | 563.2942 | ~100 |
| P8 | C3$_0$/C3$_1$ | E-1-1-1-0-0-0-0-OH | 1023.5467 | 1023.5449 | 97 |

[a]The letter E denotes the chain-end of the polymer obtained through resin cleavage. The numbers 0 and 1 correspond to the building-blocks defined as 0-bit or 1-bit.
[b]Theoretical and experimental m/z values found by ESI-HRMS for deprotonated molecules [M-H]$^-$.

The iterative immobilized polyurethane synthetic method according to some embodiments can be carried out with a wide variety of starting amino-alcohol monomers, using any combination of at least two different amino-alcohol monomers, to lead to encoded uniform, sequence-defined polyurethanes. Much like solid-phase synthesis of peptide combinatorial libraries, combinatorial librarie of uniform sequenced-defined polyurethanes may be prepared using the method according to some embodiments.

Specifically, the general procedure of Example 2 may be carried out using any one or more of the following amino-alcohol monomers:

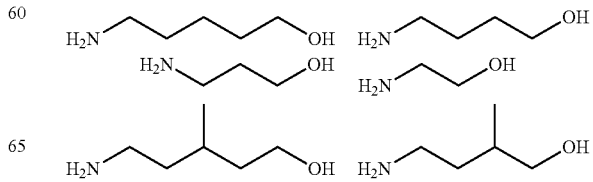

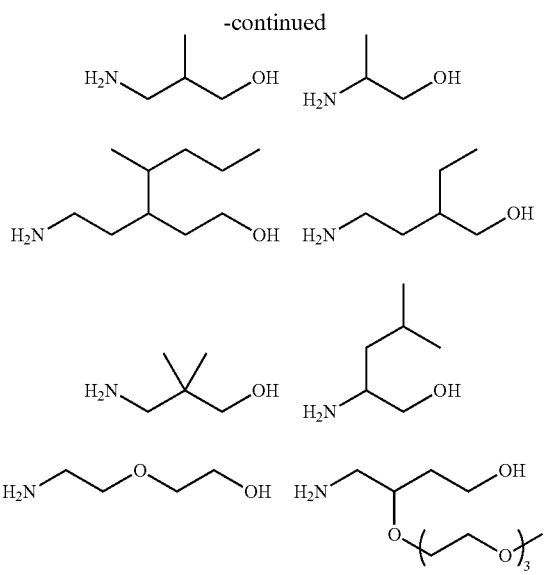

When the same amino-alcohol monomer is used through the entire iterative process, a uniform homopolyurethane is obtained.

When at least two different amino-alcohol monomers are used in the iterative synthesis, uniform sequence-defined (encoded) polyurethanes are obtained. The polyurethane sequence is determined by the user, who can choose the specific order in which the amino-alcohol monomers are incorporated into the polyurethane sequence. As such, uniform sequence-defined polyurethanes of any length may be assembled, from any two or more of the above amino-alcohol monomers, in any combination, thereby giving access to a vast combinatorial library of uniform sequence-defined polyurethanes, as exemplified in Table 2 below (combinations exemplified with 2 different monomers; i.e., binary alphabet) where A and B designate two different amino-alcohol monomers selected from the 20 choices above, and m represents the number of monomers incorporated in the polyurethane chain.

TABLE 2

| m = 4 | m = 5 | ... | m = 10 | ... | m = 20 | ... |
|---|---|---|---|---|---|---|
| E-AAAB | E-AAAAB | ... | E-(A)$_9$B | ... | E-(A)$_{19}$B | ... |
| E-AABA | E-AAABA | | E-(A)$_8$BA | | E-(A)$_{18}$BA | |
| E-ABAA | E-AABAA | | E-(A)$_7$BAA | | E-(A)$_{17}$BAA | |
| E-BAAA | E-ABAAA | | ... | | ... | |
| E-AABB | E-BAAAA | | E-(A)$_2$(B)$_2$(A)$_2$(B)$_2$(A)$_2$ | | E-(B)$_{19}$A | |
| E-ABBA | E-AAABB | | | | | |
| E-BBAA | E-AABAB | | ... | | | |
| E-ABAB | E-ABAAB | | E-(A)$_3$(B)$_2$(A)$_3$(B)$_2$ | | | |
| E-BABA | E-BAAAB | | ... | | | |
| E-BBBA | E-AABBA | | E-(AB)$_5$ | | | |
| | E-ABBAA | | ... | | | |
| | ... | | E-(B)$_7$ABB | | | |
| | E-BBBBA | | ... | | | |
| | | | E-A(B)$_9$ | | | |
| Number of possible combinations for encoding: $2^4 = 16$ | Number of possible combinations for encoding: $2^5 = 32$ | ... | Number of possible combinations for encoding: $2^{10} = 1024$ | ... | Number of possible combinations for encoding: $2^{20} = 1048576$ | ... |

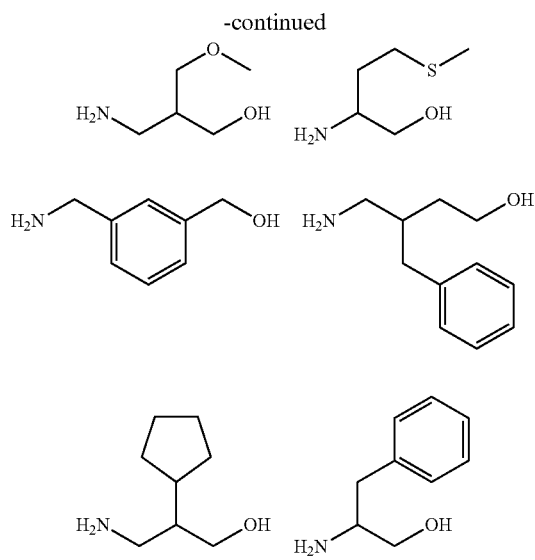

E denotes the chain-end of the polymer obtained through resin cleavage (i.e., cleavage of the responsively cleavable group Z).

As evidenced from Table 2, a binary alphabet (when 2 different amino-alcohol monomers are used to build the polyurethane sequence) and relatively short polymer chains (m=1 to 20), already give access to a great number of encoding possibilities: a pool of over 1,049,600 different structurally defined polyurethanes are available, each of which being coded by the very sequence of amino-alcohol monomers A and B that constitutes each polyurethane. The number of possible combinations (hence encoding possibilities) grows exponentially with the polyurethane length.

The number of possible combinations is further increased by the fact that alphabets greater than binary ones may be used to build the encoded polyurethanes, as illustrated in Table 3 with ternary, quaternary and quinary alphabets.

TABLE 3

Number of possible combinations for encoding

| | Polyurethane length | | | | | |
|---|---|---|---|---|---|---|
| | m = 4 | m = 5 | ... | m = 10 | ... | m = 20 ... |
| Ternary alphabet | 81 | 243 | ... | 59049 | ... | $3^{20}$ ... |
| Quaternary alphabet | 256 | 1024 | ... | 1048576 | ... | $4^{20}$ ... |
| Quinary alphabet | 625 | 3125 | ... | 9765625 | ... | $5^{20}$ ... |

Ternary alphabet: 3 different amino-alcohol monomers are used to build the polyurethane sequence;
Quaternary alphabet: 4 different amino-alcohol monomers are used to build the polyurethane sequence;
QUinary alphabet: 5 different amino-alcohol monomers are used to build the polyurethane sequence.

Example 3. General Procedure for the MS/MS Sequencing of Polyurethanes

High resolution MS and MS/MS experiments were performed using a QqTOF mass spectrometer (QStar Elite, Applied Biosystems SCIEX, Concord, ON, Canada) equipped with an ESI source operated in the negative mode (capillary voltage: −4200 V; cone voltage: −75 V). In the MS mode, ions were accurately mass measured in the orthogonal acceleration time-of-flight (oa-TOF) mass analyzer. In the MS/MS mode, precursor ions were selected in a quadrupole mass analyzer prior entering a collision cell filled with nitrogen, and products ions were measured in the oa-TOF. In this instrument, air was used as nebulizing gas (10 psi) while nitrogen was used as curtain gas (20 psi). Instrument control, data acquisition and data processing were achieved using Analyst software (QS 2.0) provided by Applied Biosystems. Polyurethanes (1-2 mg) are dissolved in methanol (300 μL) in an ultrasonic bath (15 min). Samples are further diluted (1/100 to 1/1000, v/v) in a methanolic solution of ammonium acetate (3 mM) and injected in the ESI source at 10 μL/min using a syringe pump. Polyurethanes are first ionized in negative mode electrospray ionization and so-formed deprotonated molecules observed in the MS mode are then submitted to collision-induced dissociation. Fragmentation only proceeds by competitive cleavage of all ester bonds, yielding MS/MS spectra where the distance between two consecutive peaks is equal to the mass of a coded unit. As a result, measuring m/z difference between consecutive peaks starting from the precursor ion allows the polyurethane sequence to be reconstructed from the right- to the left-hand side.

Example 4. Other Polyurethanes Prepared According to Protocols of Example 2, and Decrypted According to the Method of Example 3

Although potentially applicable on a variety of supports, the method was reduced to practice using a hydroxy-functionalized crosslinked polystyrene resin as solid support. This solid support was obtained by modifying a commercial Wang resin with a hydroxy-functional linker—cf. Example 1 above—(leading after cleavage to a C5 acid chain-end moiety, noted as "E" in this disclosure). In a first coupling step (i), the hydroxy group is reacted with N,N'-disuccinimidyl carbonate (DSC) to afford a dissymmetric active carbonate. Interestingly, it was shown that the reaction of the resulting adduct with amines is chemoselective and can be performed in the presence of unprotected alcohols). Thus, in step (ii) the formed adduct is reacted with an amino alcohol to afford selectively a hydroxy-functional carbamate. The iterative repetition of coupling steps (i) and (ii) allows protecting-group-free synthesis of uniform symmetric polyurethanes.

Various monomers were tested to further exemplify some embodiments (FIG. 1C). At first, model homopolymers were synthesized using DSC and $C5_0$. Different solvents, reactions times and temperatures were screened in order to identify optimal experimental conditions for the synthesis of uniform PUs. It was found that the use of acetonitrile and microwave irradiation in step (i) allow synthesis of uniform polymers with Đ~1. For instance, single-peaks high-resolution electrospray mass spectra were obtained for homopolymers of $C5_0$. These results imply that steps (i) and (ii) are near quantitative and that no side reactions compete significantly with the iterative synthesis.

Based on these results, monomer alphabets were then developed in order to implement readable coded sequences in the uniform PUs.

Figure 2:
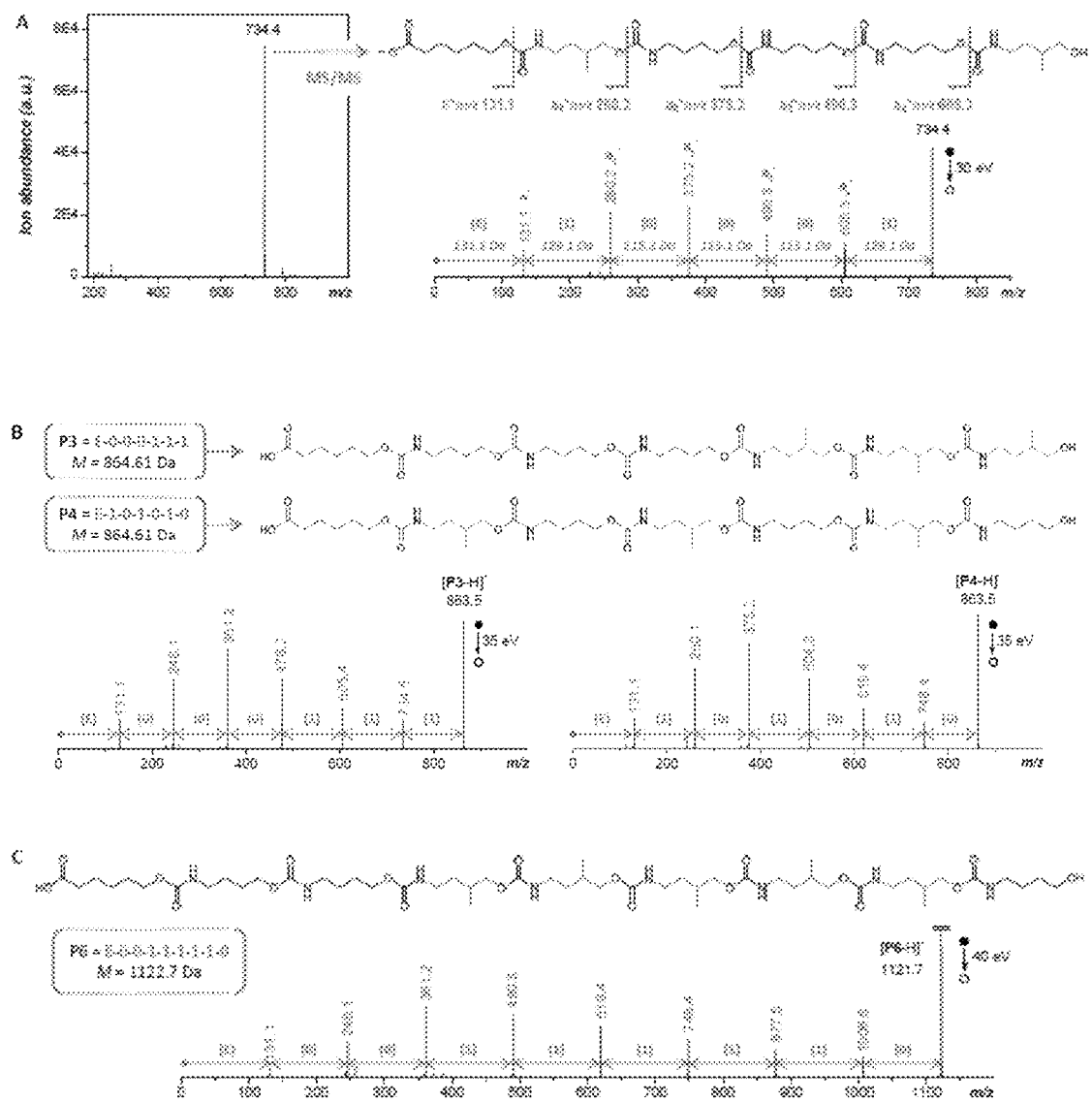
FIG. 2 illustrates a characterization and sequencing of uniform sequence-defined polyurethanes according to some embodiments prepared using a $C4_0/C4_1$ binary alphabet. (A) ESI-MS and MS/MS of an exemplary polyurethane according to some embodiments containing the binary sequence E-10001-OH (P2 in Table 1). (B) MS/MS discrimination of two isobaric polyurethane containing different binary monomer sequences (P3 and P4 in Table 1). (C) MS/MS characterization of a sequence-defined polyurethane containing a byte of binary information (P6 in Table 1).

A $H/CH_3$ molecular variation was used to implement a 0/1 digital code that can be decrypted by MS/MS. Accordingly, amino alcohols with or without methyl side groups were used to build sequence-defined Pus according to some embodiments. In particular, two different binary monomer alphabets, $C4_0/C4_1$ and $C3_0/C3_1$ (FIG. 1C), were tested. Both languages allowed synthesis of uniform copolymers. As an example, FIG. 2A illustrates ESI-MS and MS/MS spectra obtained for a copolyurethane (P2 in Table 1) synthesized with monomers $C4_0/C4_1$ and containing the information sequence E-10001-OH. The ESI-MS spectrum reveals the formation of a uniform structure. Quite remarkably, the spectra correspond to a final products that were not purified by HPLC or any other fractionation method.

Results of comparable quality were obtained for all polyurethanes including those synthesized with the alphabet $C3_0/C3_1$ (P7 and P8 in Table 1).

Figure 4:
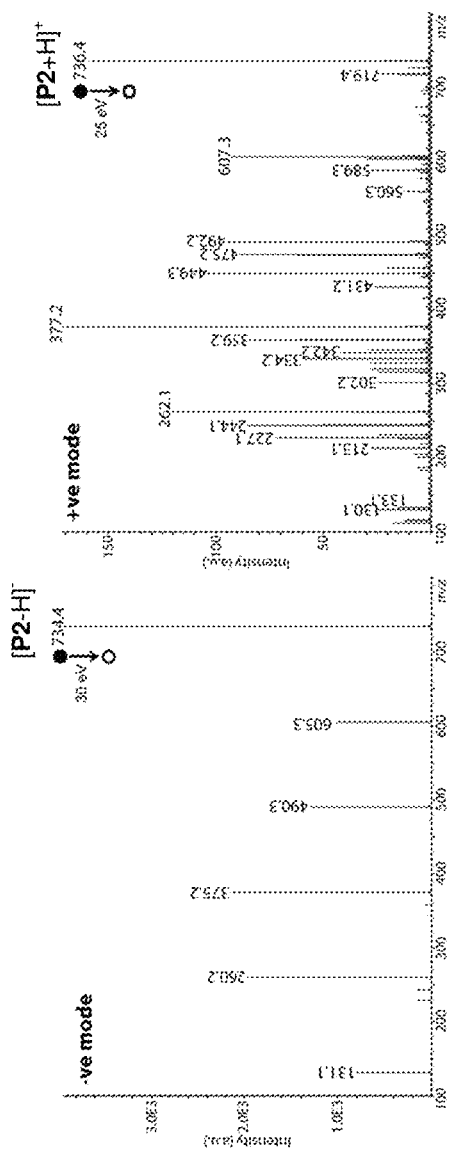
FIG. 4 shows an ESI-MS/MS spectrum of $[P2-H]^-$ at m/z 734.4 in the negative ion mode (left) and of $[P2+H]^+$ at m/z 736.4 in the positive ion mode (right).

The results show that the coupling step (ii) appears to lead to similar yields using methylated (1-bit) or non-methylated (0-bit) amino-alcohol monomers. Furthermore, the overall yields of PU synthesis were near quantitative in all cases (Table 1). All MS spectra were collected in negative mode ESI-MS/MS, which works remarkably better at sequencing the polyurethanes than positive ion mode ESI-MS/MS (FIG. 4).

As shown in FIG. 2A, activation of deprotonated polyurethanes in the negative ion mode leads only to C—O carbamate bond cleavage and therefore the digital sequences written in the polymers are very easy to read. The MS/MS decryption method allows unequivocal detection of a coded binary sequence. For instance, isobaric polyurethanes with different sequences can be easily distinguished by negative mode MS/MS, as shown in FIG. 2B. Although deprotonation occurs on the terminal carboxylic acid, the analysis of longer coded sequences is also possible and the quality of sequencing is not affected by chain-length (FIG. 2C).

Example 5. Use of Exemplary Uniform Sequence-Defined Polyurethanes of Some Embodiments as Molecular Labels Exemplary polyurethanes of some embodiments were blended in different types of polymer matrices, and processed into a film or a 3D-object using 3D-printing technology. The polyurethanes according to some embodiments can be dispersed in solid polymer materials via a variety of known procedures such as film casting, mechanical blending, spray deposition or in situ polymerization.

Polystyrene Film

Coded polystyrene films were prepared by dissolving polystyrene and the sequence-coded polyurethane in THF (8% w/v) at 40° C. where the weight ratio of polystyrene/polyurethane was 99/1. The obtained solution was poured onto a glass plate and the membranes were formed after 20 h left in room temperature. The films were further dried under vacuum until complete removal of the solvent. Homogeneous and transparent membranes were obtained.

Figure 3:
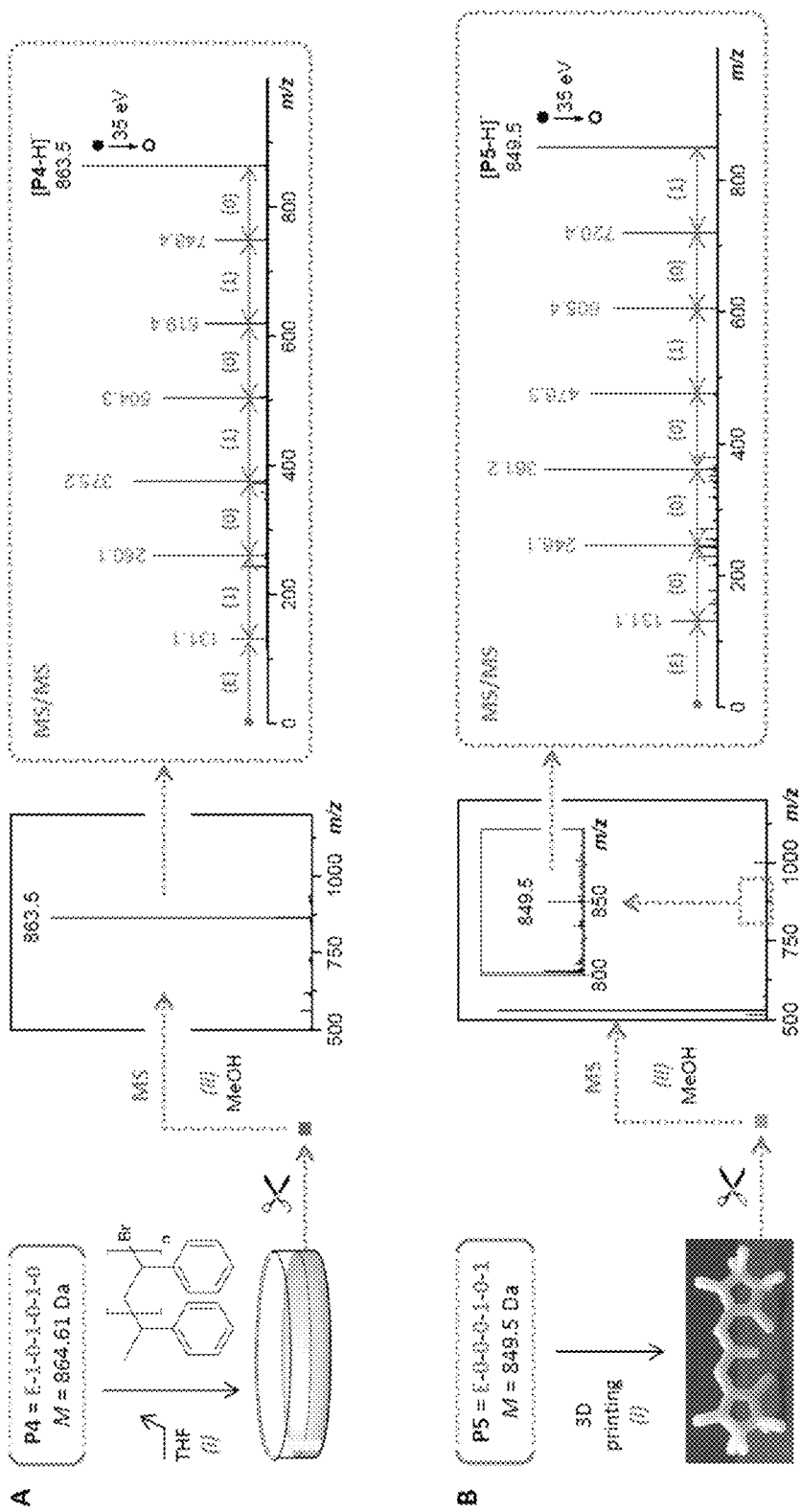
FIG. 3 exemplifies materials labelling using sequence-defined polyurethanes. (A) Labelling of an ATRP-made polystyrene film, in which 1 w % of a polyurethane containing the binary sequence E-101010-OH was dispersed (P4 in Table 1). The polyurethane barcode can be extracted from the film by selective dissolution in methanol and characterized by ESI-MS and MS/MS. (B) Labelling of a 3D-printed crosslinked poly(methacrylate) structure, in which 0.25 w % of a polyurethane containing the binary sequence E-000101-OH was incorporated (P5 in Table 1). The polyurethane can be found by grinding the skirt of the 3D print into a thin powder that is dissolved in methanol and analyzed by ESI-MS and MS/MS.

FIG. 3A shows the analysis of a polystyrene film, in which a small amount of a coded PU label was dispersed. The homogeneity of the PU label dispersion was verified by studying different fractions of the polystyrene films that were cut, dissolved in THF-$d_6$ and analyzed by $^1$H NMR. In all cases, the spectra contained specific PU signals and their integration as compared to polystyrene peaks was more or less the same in all fractions (data not shown).

After being included in the films, the PU tags can also be extracted and studied by MS. To do so, a small portion of the film was cut and immersed in methanol, which is a non-solvent of polystyrene. The sequence-defined polyurethanes are generally poorly soluble in methanol. However, they can be selectively extracted in sufficient quantity to be analyzed by ESI-MS. As shown in FIG. 3A, a single-peak ESI spectrum was obtained and its MS/MS sequencing permitted to recover easily the E-101010 coded binary information. These results confirm that PUs labels can be efficiently used to label polymers films (authentication and anti-counterfeiting system).

3D-Printed Polymer Object

A sequence-defined PU label was included in a 3D-print obtained through methacrylate-based photopolymerization.

The printing of the 3D object including a polyurethane label was performed using a Form 1+ SLA 3D Printer equipped with a Class 1 Laser and a diode of violet color of 405 nm wavelength provided by Formlabs. The polyurethane (0.25% w/v) was dissolved in the photosensitive liquid resin. The tank was filled with the resin mixture and with the help of the laser it was cured layer by layer to build the 3D model. After the building of a layer the laser was lifted up, and continued with the rest layers. The construction of 639 layers lasted 1 h 40. The volume of the obtained structure was about 8 mL. The final 3D model was characterized from a detailed and high resolution structure. It was generated on a support. After the end of the building, it was immerged in isopropyl alcohol in order to rinse parts and clean liquid uncured resin from the outer side of the 3D model. The 3D object was further cured under UV light of 350 nm wavelength for a final photo-crosslinking curing to harden completely the sculpture. With tools the support was removed and sanded to result in a smooth surface.

FIG. 3B shows the shape of the 3D print that was studied (a sculpture representing a 3D DSC molecule). In 3D printing, a significant amount of polymerized matter (i.e. draft, skirt and brim) is unused and separated from the sculpture after printing. Small amounts of these residues can be kept attached to the sculpture as an anti-counterfeit strap that can be cut and analyzed. In the present case, some parts of the skirt were grinded into a thin powder that was dissolved in methanol. The MS analysis of this solution led to a mixture of peaks, in which the signal of the PU label has a very weak intensity (inset of MS in FIG. 3B). However, this peak can be found and efficiently sequenced by MS/MS. These results indicate that a sufficient fraction of the PU coded label survives the photopolymerization process and therefore enables practical 3D-sculpture labeling/authentication.

While we have described a number of embodiments, it is apparent that our basic examples may be altered to provide other embodiments that utilize the compounds and methods of the presently disclosed subject matter. Therefore, it will be appreciated that the scope of the presently disclosed subject matter is to be defined by the appended claims rather than by the specific embodiments that have been represented by way of example.

LIST OF REFERENCES

[1] B. Lewandowski, G. De Bo, J. W. Ward, M. Papmeyer, S. Kuschel, M. J. Aldegunde, P. M. E. Gramlich, D. Heckmann, S. M. Goldup, D. M. D'Souza, A. E. Fernandes, D. A. Leigh, Sequence-Specific Peptide Synthesis by an Artificial Small-Molecule Machine, *Science* 339, 189 (2013).

[2] J. Niu, R. Hili, D. R. Liu, Enzyme-free translation of DNA into sequence-defined synthetic polymers structurally unrelated to nucleic acids, *Nat. Chem.* 5, 282 (2013).

[3] J.-F. Lutz, M. Ouchi, D. R. Liu, M. Sawamoto, Sequence-Controlled Polymers, *Science* 341, 1238149 (2013).

[4] R. K. Roy, A. Meszynska, C. Laure, L. Charles, C. Verchin, J.-F. Lutz, Design and synthesis of digitally encoded polymers that can be decoded and erased, *Nat. Commun.* 6, 7237 (2015).

[5] A. Al Ouahabi, M. Kotera, L. Charles, J.-F. Lutz, Synthesis of Uniform Sequence-Coded Polymers with Chain Lengths above DP100, *ACS Macro Lett.*, 1077 (2015).

[6] C. Cho, E. Moran, Cherry, J. Stephans, S. Fodor, C. Adams, A. Sundaram, J. Jacobs, P. Schultz, An unnatural biopolymer, *Science* 261, 1303 (1993).

[7] R. Warrass, P. Walden, K.-H. Wiesmüller, G. Jung, Oligocarbamates as MHC class I ligands, *Lett. Pept. Sci.* 5, 125 (1998).

[8] P. A. Wender, J. B. Rothbard, T. C. Jessop, E. L. Kreider, B. L. Wylie, Oligocarbamate Molecular Transporters: Design, Synthesis, and Biological Evaluation of a New Class of Transporters for Drug Delivery, *J. Am. Chem. Soc.* 124, 13382 (2002).

The invention claimed is:

1. A method of preparing a linear uniform polyurethane, the method comprising:
   (a) covalently coupling a suitable support for stepwise immobilized-polymer synthesis, bearing a cleavable tether moiety —$X_1$—Z—$X_2$—OH at its surface, with a carbonate compound of formula (I),

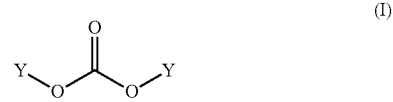

wherein:
   each occurrence of Y is independently a succinimidyl or pyridyl moiety;
   $X_1$ and $X_2$ each independently represent a covalent bond or a $C_{1-20}$aliphatic, $C_{1-20}$heteroaliphatic, $C_{6-10}$aryl, $C_{1-20}$aliphatic-$C_{6-10}$aryl, $C_{1-20}$heteroaliphatic-$C_{6-10}$aryl, $C_{3-10}$ heteroaryl, $C_{1-20}$aliphatic-$C_{3-10}$heteroaryl, or $C_{1-20}$heteroaliphatic-$C_{3-10}$heteroaryl spacer group;

Z is a functional group that is responsively cleavable under suitable conditions that are different from the reaction conditions used in (a) though (d);

to form an adduct of formula (II),

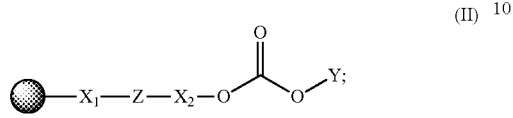
(II)

(b) covalently coupling the adduct of formula (II) with a second compound of formula $R_2HN—R_1—OH$
wherein:
$R_1$ is a $C_{1-20}$aliphatic, $C_{1-20}$heteroaliphatic, $C_{1-20}$(hetero)aliphatic-$C_{6-10}$aryl-$C_{1-20}$(hetero)aliphatic, or $C_{1-20}$(hetero)aliphatic-$C_{3-10}$heteroaryl-$C_{1-20}$(hetero)aliphatic moiety wherein each of the foregoing aliphatic or heteroaliphatic moieties may be linear, branched or cyclic and saturated or unsaturated; and $R_2$ is H or a $C_{1-20}$aliphatic, $C_{1-20}$heteroaliphatic, $C_{1-20}$(hetero)aliphatic-$C_{6-10}$aryl-$C_{1-20}$(hetero)aliphatic, or $C_{1-20}$(hetero)aliphatic-$C_{3-10}$heteroaryl-$C_{1-20}$(hetero)aliphatic moiety; wherein each of the foregoing aliphatic or heteroaliphatic moieties may be linear, branched or cyclic and saturated or unsaturated;

to form a second adduct of formula (III),

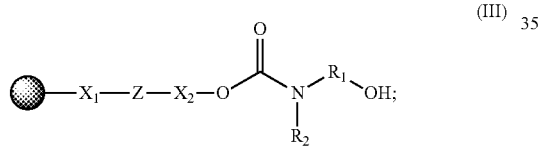
(III)

and (c) repeating (a) and (b) as many times as desired, wherein the adduct of formula (III) of iteration m-1 is used as support for covalent coupling of (a) of iteration m; and wherein the compound of formula (I) and $R_2NH—R_1—OH$ may be the same as or different from those used in previous iterations; to form a polyurethane of formula (IV),

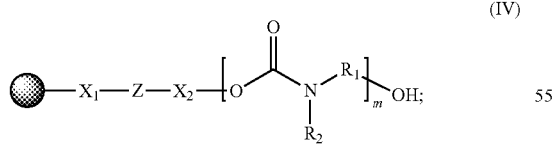
(IV)

wherein m is the number of iterations and is an integer from 2-1000.

2. The method according to claim 1, wherein:
each occurrence of $R_1$ is independently a $C_{1-10}$alkyl, $C_{1-10}$haloalkyl, $C_{1-10}$heteroalkyl, $C_{1-10}$heterohaloalkyl, $C_{1-10}$alkyl-$C_{6-10}$aryl-$C_{1-10}$alkyl, $C_{1-10}$alkyl-$C_{6-10}$aryl-$C_{1-10}$heteroalkyl, $C_{1-10}$ heteroalkyl-$C_{6-10}$aryl-$C_{1-10}$alkyl, $C_{1-10}$heteroalkyl-$C_{6-10}$aryl-$C_{1-10}$heteroalkyl, $C_{1-10}$alkyl-$C_{3-10}$heteroaryl-$C_{1-10}$alkyl, $C_{1-10}$alkyl-$C_{1-10}$heteroaryl-$C_{1-10}$heteroalkyl, $C_{1-10}$heteroalkyl-$C_{3-10}$heteroaryl-$C_{1-10}$alkyl, or $C_{1-10}$heteroalkyl-$C_{3-10}$heteroaryl-$C_{1-10}$heteroalkyl moiety bearing at least one substitutent $R_{1A}$;

further wherein:
each of the foregoing alkyl and heteroalkyl moieties may be linear, branched, or cyclic; and
each occurrence of $R_{1A}$ is independently H, linear, branched or cyclic $C_{1-6}$alkyl, linear, branched or cyclic $C_{1-8}$heteroalkyl; halogen atom; $C_{1-6}$alkyl-phenyl; a fluorescent moiety or a positively or negatively charged moiety.

3. The method according to claim 1, wherein in the compounds $R_2HN—R_1—OH$ used over the sequence of (b) and (c), two or more $R_1$ groups are different.

4. The method according to claim 2, wherein:
each occurrence of $R_1$ independently is a linear or branched alkyl of formula (VII),

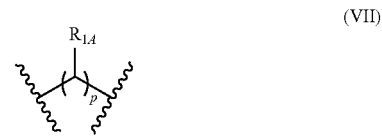
(VII)

further wherein:
p is an integer from 1-20; and
at least one occurrence of $R_{1A}$ is H or linear, branched or cyclic $C_{1-6}$alkyl, benzyl, $—(CH_2)_{1-3}O(CH_2)_{1-3}—$, $—(CH_2)_{1-3}S(CH_2)_{1-3}—$, $—O(CH_2CH_2O)_{1-3}CH_3$, $—(CH_2)_{1-3}O(CH_2)_{0-2}CH_3$, or $—(CH_2)_{1-3}S(CH_2)_{0-2}CH_3$; linear $C_{1-6}$alkyl; methyl, ethyl, n-propyl, i-propyl, n-butyl, or sec-butyl; methyl or ethyl; methyl.

5. The method according to claim 1, wherein, in each iteration of (b), $R_2$ is independently H or a $C_{1-10}$alkyl, $C_{1-10}$haloalkyl, $C_{1-10}$heteroalkyl, $C_{1-10}$heterohaloalkyl, $C_{1-10}$alkyl-$C_{6-10}$aryl-$C_{1-10}$alkyl, $C_{1-10}$alkyl-$C_{6-10}$aryl-$C_{1-10}$heteroalkyl, $C_{1-10}$heteroalkyl-$C_{6-10}$aryl-$C_{1-10}$alkyl, $C_{1-10}$heteroalkyl-$C_{6-10}$aryl-$C_{1-10}$heteroalkyl, $C_{1-10}$alkyl-$C_{3-10}$heteroaryl-$C_{1-10}$alkyl, $C_{1-10}$alkyl-$C_{3-10}$ heteroaryl-$C_{1-10}$heteroalkyl, $C_{1-10}$heteroalkyl-$C_{3-10}$heteroaryl-$C_{1-10}$alkyl, or $C_{1-10}$heteroalkyl-$C_{3-10}$ heteroaryl-$C_{1-10}$heteroalkyl moiety; wherein each of the foregoing alkyl and heteroalkyl moieties may be linear, branched, or cyclic.

6. The method according to claim 1, wherein $R_2$ is H in each iteration.

7. The method according to claim 2, wherein $E''$ is OH and E is $HO_2C—X_2—$, wherein $X_2$ is as defined in claim 1 provided that $X_2$ is bound to the $—CO_2H$ moiety via a carbon atom represents a branched or linear $C_{1-6}$alkyl chain such as $(CH_2)_5—$.

8. A polyurethane obtained by the method according to claim 2, said polyurethane being uniform and sequence-defined polymer and having the formula (VIII),

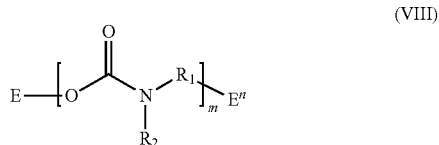
(VIII)

wherein:

E is represented by the structure

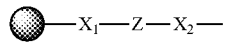

in which:

is a suitable support for stepwise immobilized-polymer synthesis;

$X_1$ and $X_2$ each independently represent a covalent bond or $C_{1-20}$aliphatic, $C_{1-20}$ heteroaliphatic, $C_{6-10}$aryl, $C_{1-20}$aliphatic-$C_{6-10}$aryl, $C_{1-20}$heteroaliphatic-$C_{6-10}$aryl, $C_{3-10}$ heteroaryl, $C_{1-20}$aliphatic-$C_{3-10}$heteroaryl, or $C_{1-20}$heteroaliphatic-$C_{3-10}$heteroaryl spacer group;

Z is a responsively cleavable functional group including a covalent bond that can be cleaved upon application of a specific trigger/signal selected from a specific chemical reaction, a change in pH (either an increase or decrease), a change in redox potential, the presence of reduction or oxidation agent, the presence of UV, visible or near infrared light, ultra-sounds, electromagnetic radiation, or a change in temperature;

E″ is a terminal group selected from OH, a $C_{1-20}$aliphatic, $C_{1-20}$heteroaliphatic, $C_{6-10}$aryl, $C_{1-20}$aliphatic-$C_{6-10}$aryl, $C_{1-20}$heteroaliphatic-$C_{6-10}$aryl, $C_{3-10}$heteroaryl, $C_{1-20}$aliphatic-$C_{3-10}$ heteroaryl, or $C_{1-20}$heteroaliphatic-$C_{3-10}$heteroaryl moiety;

each occurrence of $R_1$ is independently a $C_{1-20}$aliphatic, $C_{1-20}$heteroaliphatic, $C_{1-20}$(hetero)aliphatic-$C_{6-10}$aryl-$C_{1-20}$(hetero)aliphatic, or $C_{1-20}$(hetero)aliphatic-$C_{3-10}$heteroaryl-$C_{1-20}$(hetero)aliphatic moiety; wherein each of the foregoing aliphatic or heteroaliphatic moieties may be linear, branched or cyclic and saturated or unsaturated;

each occurrence of $R_2$ is independently H or a $C_{1-20}$aliphatic, $C_{1-20}$heteroaliphatic, $C_{1-20}$(hetero)aliphatic-$C_{6-10}$aryl-$C_{1-20}$(hetero)aliphatic, or $C_{1-20}$(hetero)aliphatic-$C_{3-10}$heteroaryl-$C_{1-20}$(hetero)aliphatic moiety; wherein each of the foregoing aliphatic or heteroaliphatic moieties may be linear, branched or cyclic and saturated or unsaturated; and m is an integer from 2 to 1000.

9. The polyurethane according to claim 8, wherein —$X_1$—Z—$X_2$— is an ester-type tether having the formula (IX),

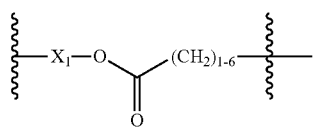

wherein:

$X_1$ is conventional linkers of Wang-type resins.

10. The polyurethane of claim 8, wherein at least two occurrences of $R_1$ are different and each occurrence of $R_2$ is H.

11. The method according to claim 2, wherein in the compounds of formula $R_2HN$—$R_1$—OH used over the sequence of (b) and (c), two or more $R_1$ groups are different.

12. The method according to claim 2, wherein:

each occurrence of $R_1$ independently is a linear or branched alkyl of formula (VII),

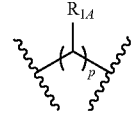

wherein:

p is an integer from 1-20; and at least one occurrence of $R_{1A}$ is H or linear, branched or cyclic $C_{1-6}$alkyl, benzyl, —$(CH_2)_{1-3}O(CH_2)_{1-3}$—, —$(CH_2)_{1-3}S(CH_2)_{1-3}$—, —$O(CH_2CH_2O)_{1-3}CH_3$, —$(CH_2)_{1-3}O(CH_2)_{0-2}CH_3$, or —$(CH_2)_{1-3}S(CH_2)_{0-2}CH_3$.

13. The method according to claim 3, wherein:

each occurrence of $R_1$ independently is a linear or branched alkyl of formula (VII),

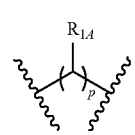

wherein:

p is an integer from 1-20; and at least one occurrence of $R_{1A}$ is H or linear, branched or cyclic $C_{1-6}$ alkyl, benzyl, —$(CH_2)_{1-3}O(CH_2)_{1-3}$—, —$(CH_2)_{1-3}S(CH_2)_{1-3}$—, —$O(CH_2CH_2O)_{1-3}CH_3$, —$(CH_2)_{1-3}O(CH_2)_{0-2}CH_3$, or —$(CH_2)_{1-3}S(CH_2)_{0-2}CH_3$.

14. The method according to claim 2, wherein, in each iteration of (b), $R_2$ is independently H or a $C_{1-10}$alkyl, $C_{1-10}$haloalkyl, $C_{1-10}$heteroalkyl, $C_{1-10}$heterohaloalkyl, $C_{1-10}$alkyl-$C_{6-10}$aryl-$C_{1-10}$alkyl, $C_{1-10}$alkyl-$C_{6-10}$aryl-$C_{1-10}$heteroalkyl, $C_{1-10}$heteroalkyl-$C_{6-10}$aryl-$C_{1-10}$alkyl, $C_{1-10}$heteroalkyl-$C_{6-10}$aryl-$C_{1-10}$heteroalkyl, $C_{1-10}$alkyl-$C_{3-10}$heteroaryl-$C_{1-10}$alkyl, $C_{1-10}$alkyl-$C_{3-10}$heteroaryl-$C_{1-10}$heteroalkyl, $C_{1-10}$heteroalkyl-$C_{3-10}$heteroaryl-$C_{1-10}$alkyl, or $C_{1-10}$heteroalkyl-$C_{3-10}$ heteroaryl-$C_{1-10}$heteroalkyl moiety; wherein each of the foregoing alkyl and heteroalkyl moieties may be linear, branched, or cyclic.

15. The method according to claim 1, wherein, in each iteration of (b), $R_2$ is independently H or a $C_{1-10}$alkyl, $C_{1-10}$haloalkyl, $C_{1-10}$heteroalkyl, $C_{1-10}$heterohaloalkyl, $C_{1-10}$alkyl-$C_{6-10}$aryl-$C_{1-10}$alkyl, $C_{1-10}$alkyl-$C_{6-10}$aryl-$C_{1-10}$heteroalkyl, $C_{1-10}$heteroalkyl-$C_{6-10}$aryl-$C_{1-10}$alkyl, $C_{1-10}$heteroalkyl-$C_{6-10}$aryl-$C_{1-10}$heteroalkyl, $C_{1-10}$alkyl-$C_{3-10}$heteroaryl-$C_{1-10}$alkyl, $C_{1-10}$alkyl-$C_{3-10}$heteroaryl-$C_{1-10}$heteroalkyl, $C_{1-10}$heteroalkyl-$C_{3-10}$heteroaryl-$C_{1-10}$alkyl, or $C_{1-10}$heteroalkyl-$C_{3-10}$ heteroaryl-$C_{1-10}$heteroalkyl moiety; wherein each of the foregoing alkyl and heteroalkyl moieties may be linear, branched, or cyclic.

16. The method according to claim 1, the method further comprising:

(d) covalently coupling, in the last iteration of (b), the adduct of formula (I) with an amino-functionalized compound of formula $R_2HN$-$R_1$-E″ wherein:

$R_1$ and $R_2$ are as defined above and $E''$ is a terminal group selected from OH, $C_{1-20}$aliphatic, $C_{1-20}$heteroaliphatic, $C_{6-10}$aryl, $C_{1-20}$aliphatic-$C_{6-10}$aryl, $C_{1-20}$heteroaliphatic-$C_{6-10}$aryl, $C_{3-10}$heteroaryl, $C_{1-20}$aliphatic-$C_{3-10}$heteroaryl, or $C_{1-20}$heteroaliphatic-$C_{3-10}$heteroaryl moiety wherein each of the foregoing aliphatic or heteroaliphatic moieties may be linear, branched or cyclic and saturated or unsaturated;

to form a polyurethane of formula (V),

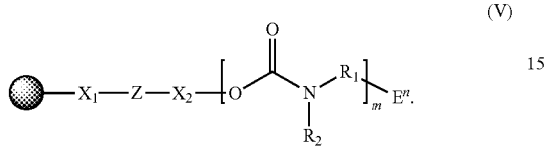

(V)

17. The method according to claim 16, the method further comprising:
    (e) cleaving the responsively cleavable functional group Z binding the polyurethane to the support, under suitable conditions;
    to form a uniform polyurethane of formula (VI),

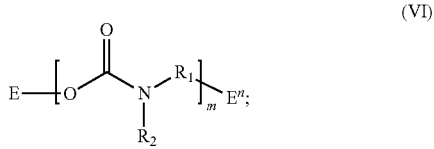

(VI)

wherein:
m, $R_1$ and $R_2$ are as defined above;
E represents Z'—$X_2$ wherein Z' represents a residual functional group resulting from the cleavage of Z, or a moiety that is or comprises the support for stepwise immobilized-polymer synthesis used in (a); and $E''$ is a terminal group selected from OH, a $C_{1-20}$aliphatic, $C_{1-20}$heteroaliphatic, $C_{6-10}$aryl, $C_{1-20}$aliphatic-$C_{6-10}$aryl, $C_{1-20}$heteroaliphatic-$C_{6-10}$aryl, $C_{3-10}$heteroaryl, $C_{1-20}$aliphatic-$C_{3-10}$ heteroaryl, or $C_{1-20}$heteroaliphatic-$C_{3-10}$heteroaryl moiety;

further wherein each of the foregoing aliphatic or heteroaliphatic moieties may be linear, branched or cyclic and saturated or unsaturated.

18. The method according to claim 1, the method further comprising:
    (e) cleaving the responsively cleavable functional group Z binding the polyurethane to the support, under suitable conditions;
    to form a uniform polyurethane of formula (VI),

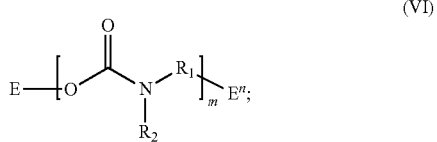

(VI)

wherein:
m, $R_1$ and $R_2$ are as defined above;
E represents Z'—$X_2$ wherein Z' represents a residual functional group resulting from the cleavage of Z, or a moiety that is or comprises the support for stepwise immobilized-polymer synthesis used in (a); and
$E''$ is a terminal group being OH.

19. The method according to claim 1, wherein Z is selected from among a labile carboxylic ester and a disulfide functional group.

20. The method according to claim 17, wherein E represents Z'—$X^2$ wherein Z' represents a residual functional group resulting from the cleavage of Z.

21. The method according to claim 18, wherein E represents Z'—$X^2$ wherein Z' represents a residual functional group resulting from the cleavage of Z.

* * * * *